United States Patent
Kyou et al.

(10) Patent No.: US 7,541,987 B2
(45) Date of Patent: Jun. 2, 2009

(54) PORTABLE TERMINAL APPARATUS WITH TV FUNCTION AND TV ANTENNA WITH FUNCTION AS INPUT PEN

(75) Inventors: Gai Kyou, Tokyo (JP); Chitoshi Aramaki, Tokyo (JP); Hideki Terauchi, Tokyo (JP); Yoshiki Miyazawa, Tokyo (JP)

(73) Assignee: NEC Corporation, Tokyo (JP)

( * ) Notice: Subject to any disclaimer, the term of this patent is extended or adjusted under 35 U.S.C. 154(b) by 290 days.

(21) Appl. No.: 11/261,592

(22) Filed: Oct. 31, 2005

(65) Prior Publication Data
US 2006/0094464 A1    May 4, 2006

(30) Foreign Application Priority Data
Nov. 1, 2004   (JP)   ............... 2004-318615

(51) Int. Cl.
*H01Q 1/24*    (2006.01)
(52) U.S. Cl. .............. 343/702; 345/179; 178/19.01
(58) Field of Classification Search ......... 343/702, 343/900; 345/179; 178/18, 4, 19.01
See application file for complete search history.

(56) References Cited

U.S. PATENT DOCUMENTS

| | | | |
|---|---|---|---|
| 5,889,512 A | 3/1999 | Moller et al. | |
| 6,104,350 A | 8/2000 | Ng et al. | |
| 6,262,684 B1 | 7/2001 | Stewart et al. | |
| 6,424,369 B1* | 7/2002 | Adair et al. | 348/76 |
| 6,573,868 B2* | 6/2003 | Johnson et al. | 343/702 |
| 2002/0067408 A1* | 6/2002 | Adair et al. | 348/76 |
| 2003/0192950 A1* | 10/2003 | Muterspaugh | 235/472.01 |

FOREIGN PATENT DOCUMENTS

| | | |
|---|---|---|
| EP | 0 784 353 A1 | 7/1997 |
| JP | 7-336759 A | 12/1995 |
| JP | 10-307643 A | 11/1998 |
| JP | 11-284419 A | 10/1999 |
| WO | WO 2004/051797 A1 | 6/2004 |

* cited by examiner

*Primary Examiner*—Tho G Phan
(74) *Attorney, Agent, or Firm*—Sughrue Mion, PLLC

(57) ABSTRACT

A portable terminal apparatus with TV function and a TV antenna with function as an input pen, in which the TV antenna is integrated with the input pen for the touch panel while ensuring sufficient sensitivity so that the internal space of the apparatus is effectively utilized, thus rendering the apparatus smaller and lighter. In the case of using a TV antenna with function as an input pen as an input pen, a mounting operation portion is pushed in a longitudinal direction with a fingertip for pushing it into the apparatus. Thereby, the hold state of the apparatus is released by a function of a latch switch, and the TV antenna with function as an input pen is pushed out to be pulled out of the apparatus. That is, the cellular phone has a configuration in which the TV antenna with function as an input pen cannot be pushed to be detached from the apparatus unless the user contracts a multistage antenna section and houses it completely in a pen body.

27 Claims, 32 Drawing Sheets

F I G. 9
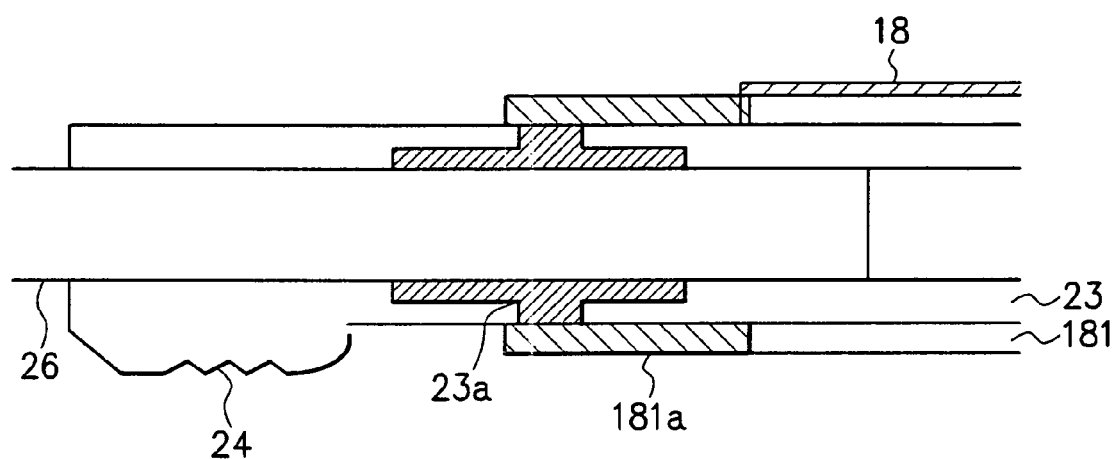

SWITCHED BY EACH PUSH OF
SWITCH WITH PEN TIP

F I G. 17
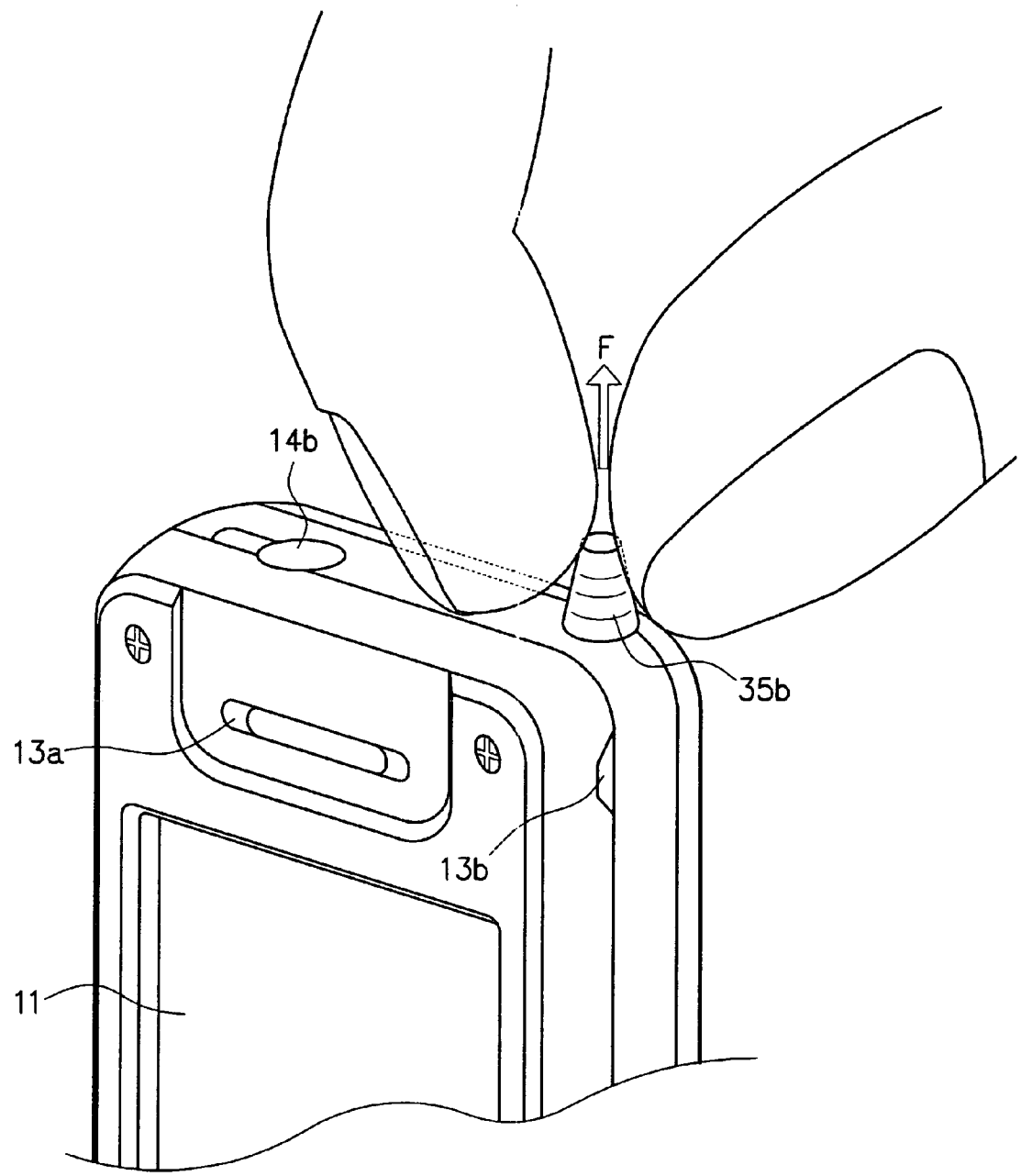

F I G. 24
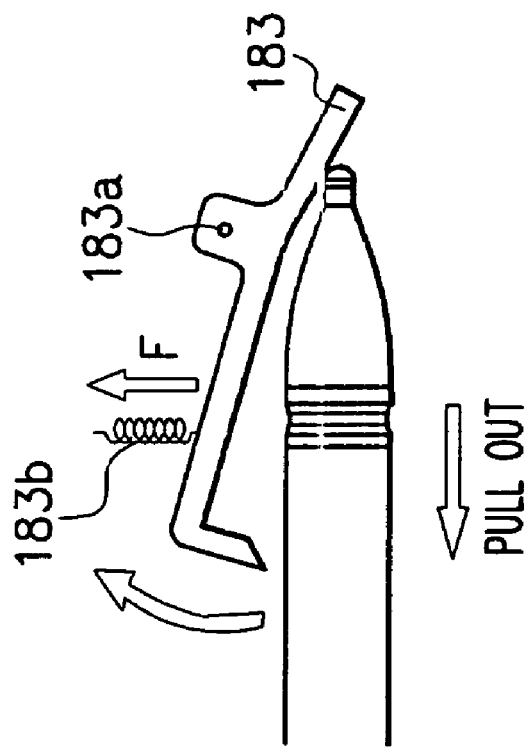
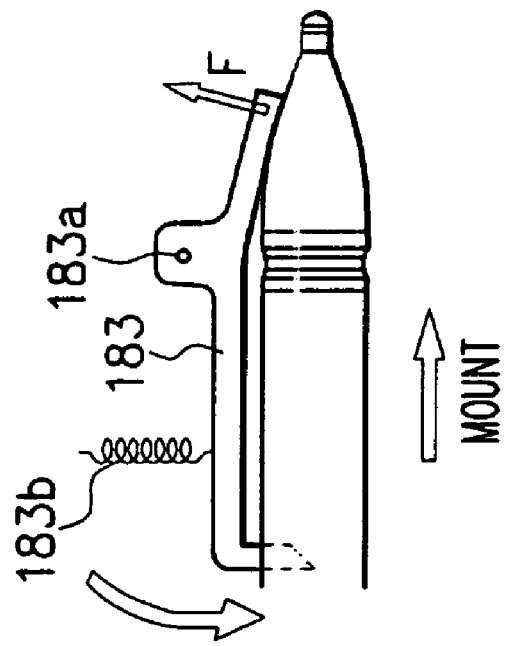

FIG. 31
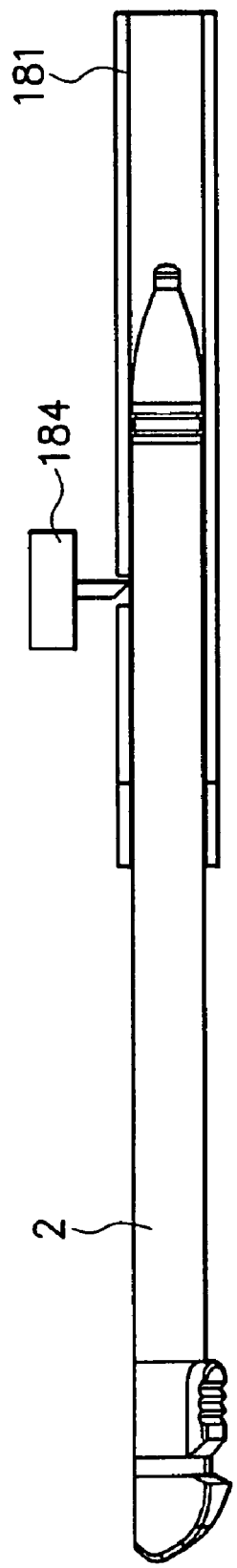
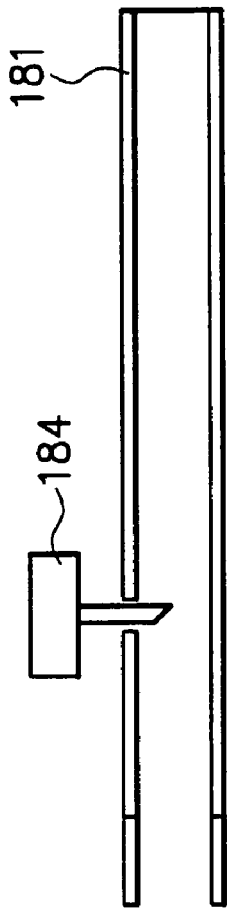

F I G. 33

MESSAGE (a)

TV ANTENNA IS MOUNTED BUT TV SIGNAL IS VERY WEAK. GO TO PLACE WHERE RADIO WAVE IS GOOD OR ADJUST ANTENNA DIRECTION.

~11

MESSAGE (b)

MOUNT TV ANTENNA

~11

PORTABLE TERMINAL APPARATUS WITH TV FUNCTION AND TV ANTENNA WITH FUNCTION AS INPUT PEN

BACKGROUND OF THE INVENTION

1. Field of the Invention

The present invention relates to a portable terminal apparatus with TV (television) program receiving function, and a TV antenna with function as an input pen.

2. Description of the Related Art

There have been commercially available and popular portable terminal apparatuses with TV function, such as cellular phone with TV function, which displays a TV (television) image on the display and outputs voice from the speaker or the like whereby a user can watch a TV program.

As such portable terminal apparatuses are increasingly demanded to become further multifunctional, smaller and lighter, it is important to use internal space of the apparatus as effectively as possible.

In Japanese Patent Application laid open Nos. HEI7-336759 and HEI11-284419, there is disclosed a portable terminal with an input function by an input pen. The portable terminal has a display capable of receiving an input from a touch panel, by using an antenna integrated with a touch pen to render the terminal smaller and lighter.

However, there is the following problem in the case of providing an antenna integrated with an input pen for manual input as described above to the above-mentioned conventional portable terminal apparatuses with TV function.

Radio wave used for radio communication (900/1800, 1900 MHz in the case of GSM; 2000 MHz in the case of W-CDMA; and 800 MHz in the case of CDMA) has a narrower frequency range and a higher frequency than that used for terrestrial TV broadcasting. Therefore, a TV receiving antenna (TV antenna) requires a larger volume than such a radio communication antenna, which also causes the space required for storage to be larger.

Consequently, even if the radio communication antenna provided separately from the TV antenna is servable as the input pen, the effect on the small size and light weight of the apparatus is reduced because the TV antenna is larger.

For this reason, and also for reducing radio wave radiation to the user during the radio communication, a planar inverted F antenna is often used in the conventional portable terminal apparatuses with TV function. In this case, the radio communication antenna cannot be integrated with the input pen due to its shape.

SUMMARY OF THE INVENTION

It is therefore an object of the present invention to provide a portable terminal apparatus with TV function and a TV antenna with function as an input pen, in which the TV antenna is integrated with the input pen for the touch panel while ensuring sufficient sensitivity so that the internal space of the apparatus is effectively utilized, thus rendering the apparatus smaller and lighter.

In accordance with the first aspect of the present invention, to achieve the object mentioned above, there is provided a portable terminal apparatus with TV function comprising: a display/input section capable of displaying a TV image and receiving an input from a touch panel; a controller for controlling the display/input section to display the TV image thereon; and a TV receiving antenna formed of elastically combined conductive materials and connected to the controller, wherein the TV receiving antenna includes a TV antenna with function as an input pen configuring at least a part of the TV receiving antenna and functioning as an input pen for providing input to the display/input section.

Preferably, the portable terminal apparatus with TV function further comprises a latch mechanism for supporting the TV antenna with function as an input pen on the apparatus in such a manner that the TV antenna is demountable from the apparatus by being pushed into the apparatus in a longitudinal direction when mounted on the apparatus. The TV antenna with function as an input pen is pushed into the apparatus by contracting a portion formed of elastically combined conductive materials and detachably mounted on the apparatus.

Preferably, when the TV antenna with function as an input pen is pushed into and mounted on the apparatus, the latch mechanism locks the TV antenna to prevent it from coming off in the longitudinal direction, and releases the lock when the TV antenna in the locked state is pushed into the apparatus in the longitudinal direction thereof.

Preferably, the TV antenna with function as an input pen is configured to be extendable and contractible in the longitudinal direction thereof, and is mounted on the apparatus so that, while the TV antenna is mounted on the apparatus, a pushing portion of an operational member provided for pushing the TV antenna into the apparatus in the longitudinal direction of the TV antenna is exposed outside the apparatus and a portion of the TV antenna configured integrally with a contact input portion contacted with the display/input section to provide input cannot be pushed into the apparatus.

Preferably, the TV antenna with function as an input pen has a movement lock concavity provided for limiting longitudinal movement thereof by the latch mechanism. The latch mechanism includes a sandwiching member for sandwiching and supporting the TV antenna with function as an input pen with the movement lock concavity. When the TV antenna is in the locked state, the sandwiching member is fixed in a state of sandwiching it from both sides in a direction substantially vertical to the longitudinal direction of the TV antenna so as to lock the TV antenna and prevent it from coming off the apparatus.

Preferably, the latch mechanism releases the lock by opening the sandwiching member sandwiching the TV antenna with function as an input pen from both sides to lock it when the TV antenna is pushed into the apparatus in the longitudinal direction.

Preferably, the latch mechanism is placed at a position to be pressed by the contact input portion in the longitudinal direction of the TV antenna with function as an input pen when the TV antenna is pushed into the apparatus, and has a push switch for opening and closing the sandwiching member at the position to be pressed.

Preferably, when the push switch is pushed to release the lock, the latch mechanism ejects the TV antenna with function as an input pen to the outside of the apparatus in the longitudinal direction in reaction to the push switch pushed back.

Preferably, the TV antenna with function as an input pen is housed inside the apparatus so that, while the TV antenna is mounted on the apparatus, the portion configured integrally with the contact input portion is exposed only in one direction incapable of being sandwiched and held in the direction vertical to the longitudinal direction of the TV antenna.

The TV antenna with function as an input pen may be housed inside the apparatus so that, while the TV antenna is mounted on the apparatus, the portion configured integrally with the contact input portion is not exposed outside the apparatus.

The TV antenna with function as an input pen may also be housed inside the apparatus so that, while the TV antenna is mounted on the apparatus, only the pushing portion of the operational member provided for pushing the TV antenna into the apparatus in the longitudinal direction of the TV antenna is exposed.

Preferably, the TV receiving antenna includes: a multistage antenna section of the TV antenna with function as an input pen; and an in-apparatus antenna section configured to be electrically conductive with the multistage antenna section when the TV antenna with function as an input pen is mounted on the apparatus, and connected to the controller.

Preferably, while the TV antenna is mounted on the apparatus, the TV antenna with function as an input pen is pushed into the apparatus only by contracting the multistage antenna section and housing it completely inside TV antenna.

Preferably, the multistage antenna section is configured by concentrically combining a plurality of cylindrical bodies. The cylindrical body with the smallest radius in the concentric circles is most distant from the contact input portion contacted with the display/ input section to provide input while the multistage antenna section is extended and housed inside the TV antenna with function as an input pen while the multistage antenna section is contracted.

Preferably, the TV antenna with function as an input pen includes an extension preventing section for preventing extension of the multistage antenna section when the TV antenna with function as an input pen is not mounted on the apparatus.

Preferably, the extension preventing section is placed inside the main body of a pen corresponding to the cylindrical body portion of the TV antenna with function as an input pen for housing the multistage antenna section while the multistage antenna section is contracted, and locks the slide movement of the thinnest cylindrical body of the multistage antenna section to lock the slide movement of all the cylindrical bodies configuring the multistage antenna section.

Preferably, the extension preventing section is placed inside one of the plurality of cylindrical bodies configuring the multistage antenna section, and locks the slide movement of the thinnest cylindrical body of the multistage antenna section to lock the slide movement of the cylindrical body on the further end side compared to the cylindrical body one step thinner than the cylindrical body having the extension preventing section placed therein.

Preferably, the extension preventing section is a plate spring charged to have elastic resilience toward the center in the radial direction of the cylindrical body having the extension preventing section placed therein, and, when subjected to no pressure from the outside, presses the edge against a fixing concavity provided to the thinnest cylindrical body of the multistage antenna section by the resilience to lock the slide movement of the thinnest cylindrical body.

Preferably, the portable terminal apparatus with TV function further comprises a lock releasing section for, when the TV antenna with function as an input pen is mounted on the apparatus, releasing the lock of the slide movement by pressing the plate spring toward the outside in the radial direction of the cylindrical body having the plate spring placed therein.

Preferably, the lock releasing section exerts pressure to release the lock by the plate spring in response to the insertion of the releasing end into the TV antenna with function as an input pen when the TV antenna is mounted on the apparatus, and releases the pressure in response to the pull-out of the releasing end from the TV antenna with function as an input pen when the TV antenna is pulled out of the apparatus.

Preferably, the lock releasing section is supported on the apparatus by a rotation axis further inside from the releasing end and the end other than the releasing end so that the support allows the lock releasing section to rotate against the apparatus and charged by a spring to have elastic resilience in such a direction that the releasing end moves away from the TV antenna with function as an input pen. When the end other than the releasing end is pushed by the mounting of the TV antenna with function as an input pen on the apparatus, the releasing end presses the plate spring toward the outside in the radial direction of the cylindrical body to release the lock by the plate spring by rotational movement about the rotation axis. When the TV antenna with function as an input pen is pulled out of the apparatus, the releasing end rotates, due to the charge of the spring, about the rotation axis in such a direction that the releasing end moves away from the TV antenna so that the rotation causes the plate spring not to be pressed toward the outside in the radial direction of the cylindrical body.

Preferably, the in-apparatus antenna section is a coil antenna or a meander antenna.

Preferably, the multistage antenna section has an optimal length for receiving VHF when extended to the maximum, and has an optimal length for receiving UHF when contracted to a predetermined length.

Preferably, the TV antenna with function as an input pen has a bendable hinge freely rotatable with its central axis in the longitudinal direction of the TV antenna at a position exposed outside the apparatus when the TV antenna is mounted on the apparatus and completely extended in the longitudinal direction.

Preferably, the hinge is placed at a position to which the TV antenna with function as an input pen moves when extended and contracted.

Preferably, a portable terminal apparatus with TV function further comprises a mounting state detecting section for detecting whether or not the TV antenna with function as an input pen is mounted on the apparatus, and the controller controls the display/input section to display a message for prompting adjustment of the reception state according to the detection result obtained by the mounting state detecting section when TV signal strength is lower than a predetermined threshold.

Preferably, the controller controls the display/input section to display a message for prompting adjustment of the reception state when TV signal strength is lower than a predetermined threshold.

Preferably, the TV antenna with function as an input pen has the portion, which is configured integrally with the contact input portion contacted with the display/input section to provide input, made of insulating material except for a contact portion for rendering the elastically combined conductive materials to function as the TV receiving antenna.

In accordance with the second aspect of the present invention, there is provided a TV antenna with function as an input pen used for a portable terminal apparatus with a display/ input section capable of displaying a TV image and receiving an input from a touch panel, comprising: a contact input portion contacted with the display/input section to provide input; and a movement lock concavity by which the portable terminal apparatus detachably support the TV antenna with function as an input pen.

Preferably, the movement lock concavity is provided to lock the longitudinal movement of the TV antenna with function as an input pen so that it does not come off the apparatus.

Preferably, the TV antenna with function as an input pen includes an operational member for allowing the TV antenna with function as an input pen to be pushed into the apparatus when a portion formed of elastically combined conductive materials is contracted.

Preferably, the TV antenna with function as an input pen further comprises a multistage antenna section formed of elastically combined conductive materials, and the multistage antenna section is at least a part of the TV receiving antenna of the portable terminal apparatus.

Preferably, the multistage antenna section is configured by concentrically combining a plurality of cylindrical bodies. The cylindrical body with the smallest radius in the concentric circles is most distant from the contact input portion while the multistage antenna section is extended and housed inside the TV antenna with function as an input pen while the multistage antenna section is contracted.

Preferably, the TV antenna with function as an input pen further comprises an extension preventing section for preventing extension of the multistage antenna section when TV antenna is not mounted on the apparatus.

Preferably, the extension preventing section is placed inside the main body of a pen corresponding to the cylindrical body portion of the TV antenna with function as an input pen for housing the multistage antenna section while the multistage antenna section is contracted, and locks the slide movement of the thinnest cylindrical body of the multistage antenna section to lock the slide movement of all the cylindrical bodies configuring the multistage antenna section.

The extension preventing section may be placed inside one of the plurality of cylindrical bodies configuring the multistage antenna section, and locks the slide movement of the thinnest cylindrical body of the multistage antenna section to lock the slide movement of the cylindrical body on the further end side compared to the cylindrical body one step thinner than the cylindrical body having the extension preventing section placed therein.

Preferably, the extension preventing section is a plate spring charged to have elastic resilience toward the center in the radial direction of the cylindrical body having the extension preventing section placed therein, and, when subjected to no pressure from the outside, presses the edge against a fixing concavity provided to the thinnest cylindrical body of the multistage antenna section by the resilience to lock the slide movement of the thinnest cylindrical body.

Preferably, a lock releasing opening is formed to insert in the apparatus the lock releasing section for, while the TV antenna with function as an input pen is mounted on the apparatus, pressing the plate spring toward the outside in the radial direction of the cylindrical body having the plate spring placed therein.

Preferably, the multistage antenna section has an optimal length for receiving VHF when extended to the maximum, and has an optimal length for receiving UHF when contracted to a predetermined length.

Preferably, the TV antenna with function as an input pen further comprises a bendable hinge freely rotatable with its central axis in the longitudinal direction of the TV antenna at a position exposed outside the apparatus when the TV antenna is mounted on the apparatus and completely extended.

Preferably, the hinge is placed at a position moving to the contact input portion when the TV antenna with function as an input pen is expanded and contracted.

As described above, in accordance with the present invention, the TV antenna is integrated with the input pen for the touch panel while ensuring sufficient sensitivity. Thus, the internal space of the apparatus is effectively utilized, which realizes the smaller and lighter apparatus.

BRIEF DESCRIPTION OF THE DRAWINGS

FIG. 2 (b) is a front view of the cellular phone;

FIG. 2 (c) is a bottom view of the cellular phone;

FIG. 2 (d) is a right side view of the cellular phone;

FIG. 9 is an enlarged sectional view showing surroundings of an antenna connection terminal 23a;

FIG. 16 (b) is a front view of the cellular phone;

FIG. 16 (c) is a bottom view of the cellular phone;

FIG. 16 (d) is a right side view of the cellular phone;

FIG. 17 is a diagram showing the operation to extend a TV antenna with function as an input pen 3 for use as the TV receiving antenna;

FIG. 20 (b) is a front view of the cellular phone;

FIG. 20 (c) is a bottom view of the cellular phone;

FIG. 20 (d) is a right side view of the cellular phone;

FIG. 21 (b) is a diagram showing the operation to extend a TV antenna with function as an input pen for use as the TV receiving antenna according to the third embodiment of the present invention, showing the pulling operation to extend the multistage antenna section of the TV antenna.

FIG. 21 (c) is a diagram showing the TV receiving antenna according to the third embodiment of the present invention, showing the multistage antenna section of the TV antenna extended.

FIG. 21 (d) is a diagram showing the operation to contract the TV antenna with function as an input pen for use as the TV receiving antenna according to the third embodiment of the present invention, showing the pushing operation to insert the multistage antenna section of the TV antenna into the cellular phone.

FIG. 24 (a) is a diagram showing the operation of a lock releasing member 183 to release the lock;

FIG. 24 (b) is a diagram showing the operation of the lock releasing member 183 not to release the lock;

FIG. 31 (a) is a diagram showing a mounting state detecting switch 184 when the TV antenna with function as an input pen 2 is mounted on the mounting portion 181 according to a seventh embodiment of the present invention;

FIG. 31 (b) is a diagram showing the mounting state detecting switch 184 when the TV antenna with function as an input pen 2 is not mounted on the mounting portion 181 according to a seventh embodiment of the present invention;

FIG. 33 is a diagram showing examples of the operational message relating to the TV antenna state.

DESCRIPTION OF THE PREFERRED EMBODIMENTS

Figure 1:
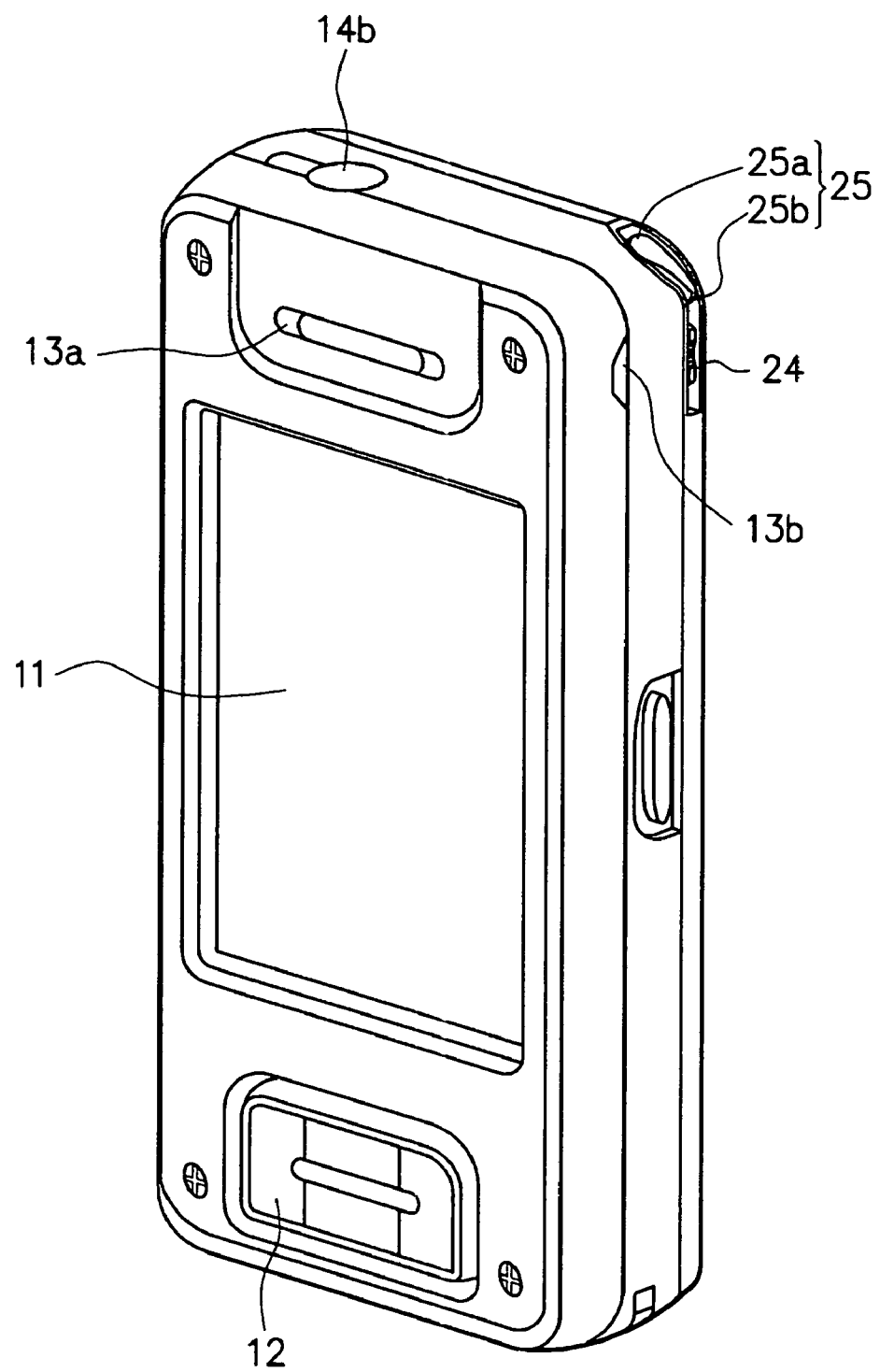
FIG. 1 is a perspective view showing an example of the appearance of a cellular phone according to the first embodiment of the present invention.
Figure 2A:
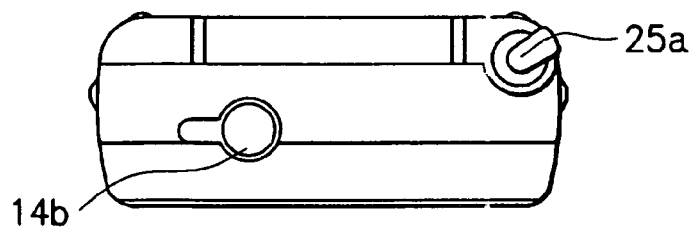
FIG. 2 (a) is a plan view of the cellular phone.
Figure 2B:
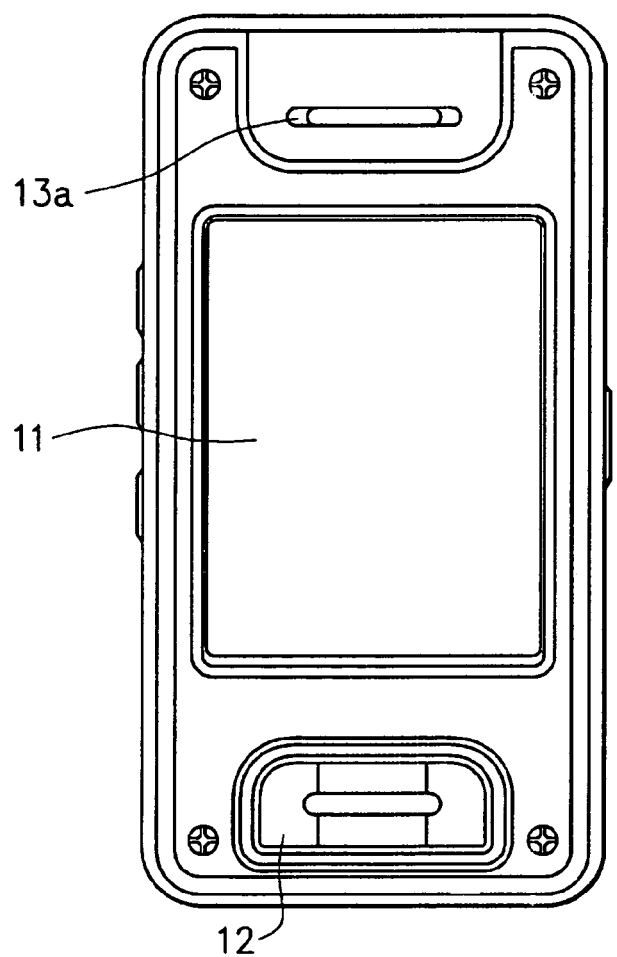
Figure 2D:
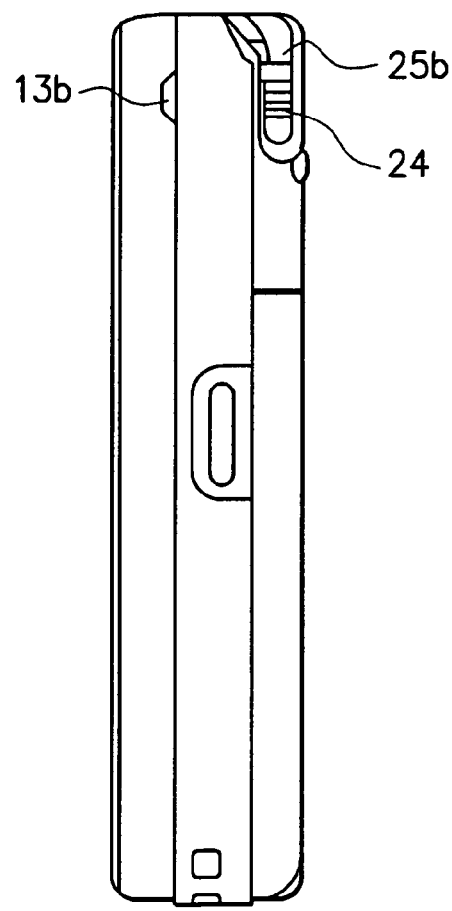
Figure 2C:
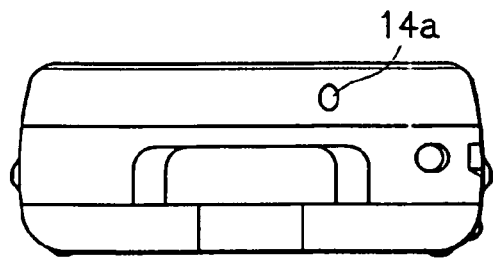

Referring now to the drawings, a description of preferred embodiments of the present invention will be given in detail. In the embodiments, a portable terminal apparatus with TV function and a TV antenna with function as an input pen of the present invention are applied to a cellular phone.

First Embodiment

As shown in FIGS. 1 to 4, according to the first embodiment of the present invention, a cellular phone 1 comprises a display/input section 11 for displaying various kinds of information and receiving an input from a touch panel, an operation input section 12 used for various input operations by a user such as input with a four-way key according to a screen display, a call speaker 13a and a call microphone 14a for conversation on the cellular phone 1, a speaker 13b for hearing sound even in a distant place as for example when receiving TV, and a terminal connecting section 14b for connecting an external microphone or an external speaker thereto. The cellular phone 1 is also provided with a TV antenna with function as an input pen 2 functioning as a TV receiving antenna and an input pen for the display/input section 11 detachably mounted thereon.

Here, the main body of the cellular phone 1 indicates a remaining portion (part of the cellular phone 1 other than the TV antenna with function as an input pen 2) after the TV antenna with function as an input pen 2 is pulled out of the cellular phone 1.

Figure 3:
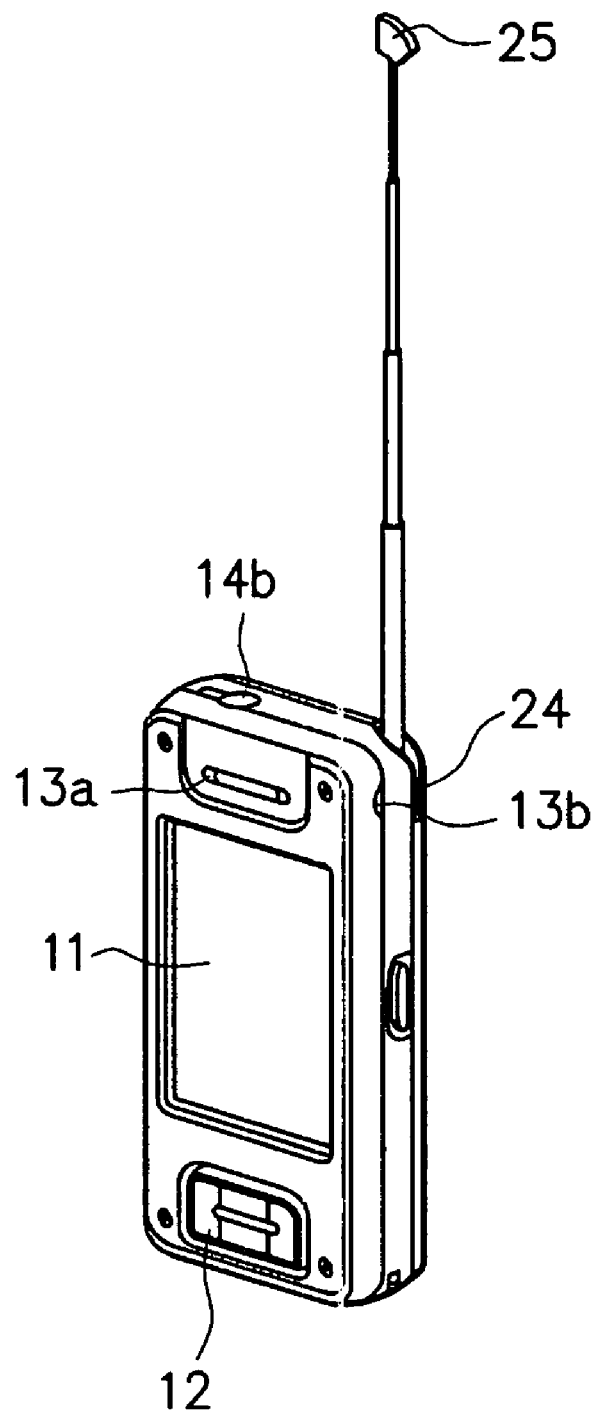
FIG. 3 is a perspective view showing an example of the appearance of the cellular phone when a multistage antenna section thereof is extended.
Figure 4:
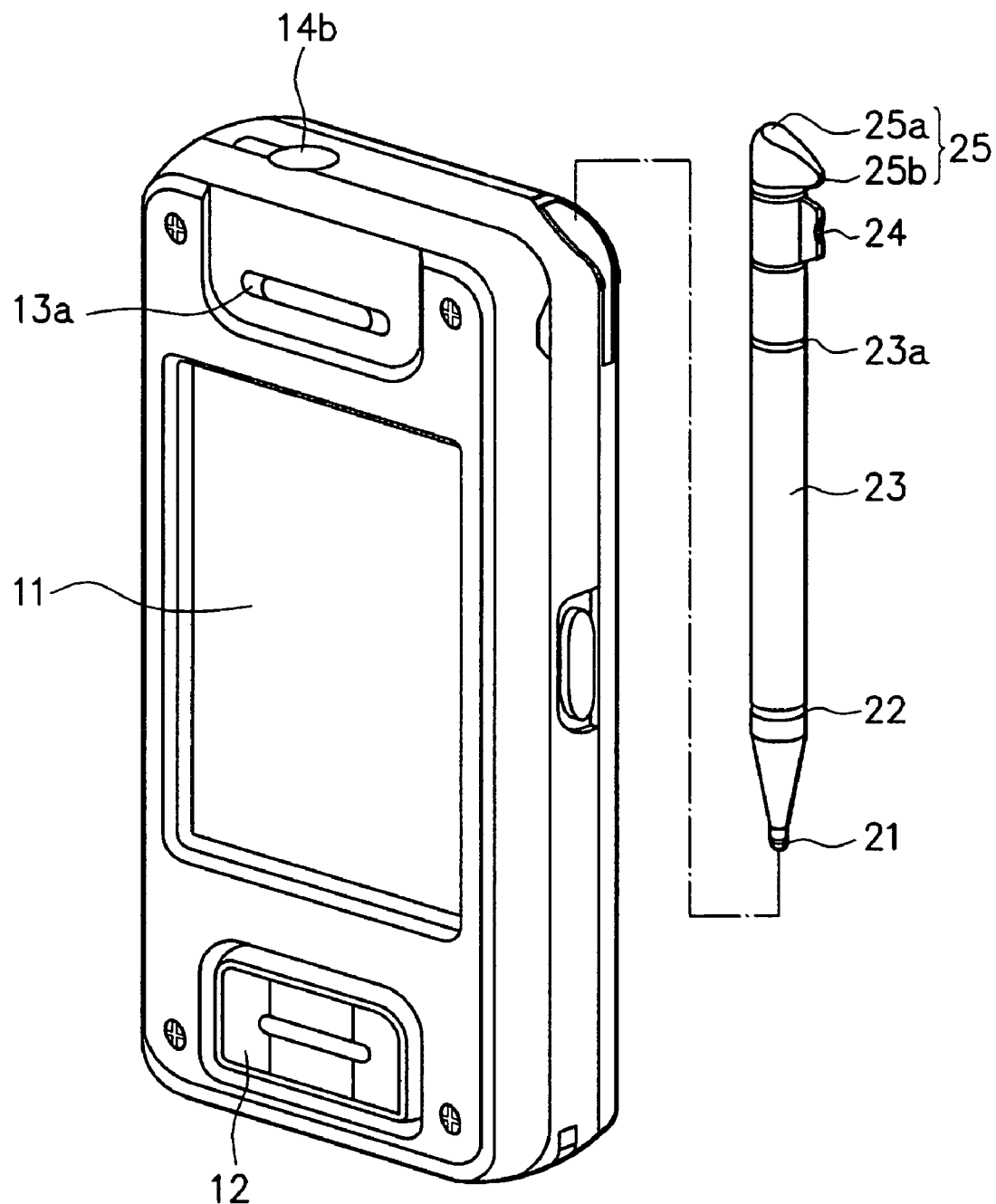
FIG. 4 is a perspective view showing an example of the appearance of the cellular phone with a TV antenna with function as an input pen 2 being pulled out of the cellular phone.

The TV antenna with function as an input pen 2 functions as a part of the TV receiving antenna when extended while mounted on the main body as shown in FIG. 3, and also functions as the input pen for manual input by being pressed against the display/input section 11 when detached from the main body as shown in FIG. 4.

Figure 5:
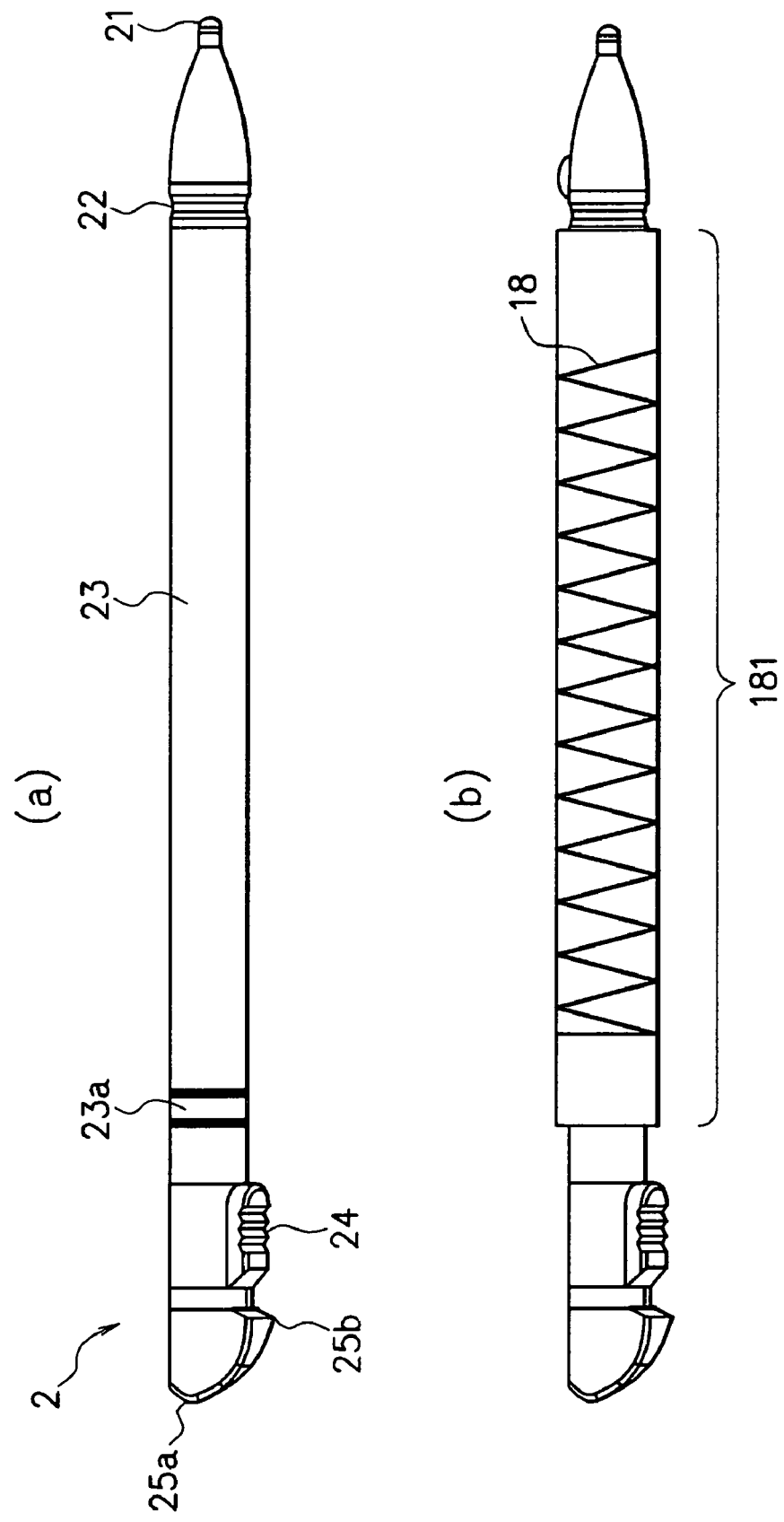
FIG. 5 is a diagram showing the TV antenna with function as an input pen 2 and a mounting portion 181 when the multistage antenna section is housed.
Figure 6:
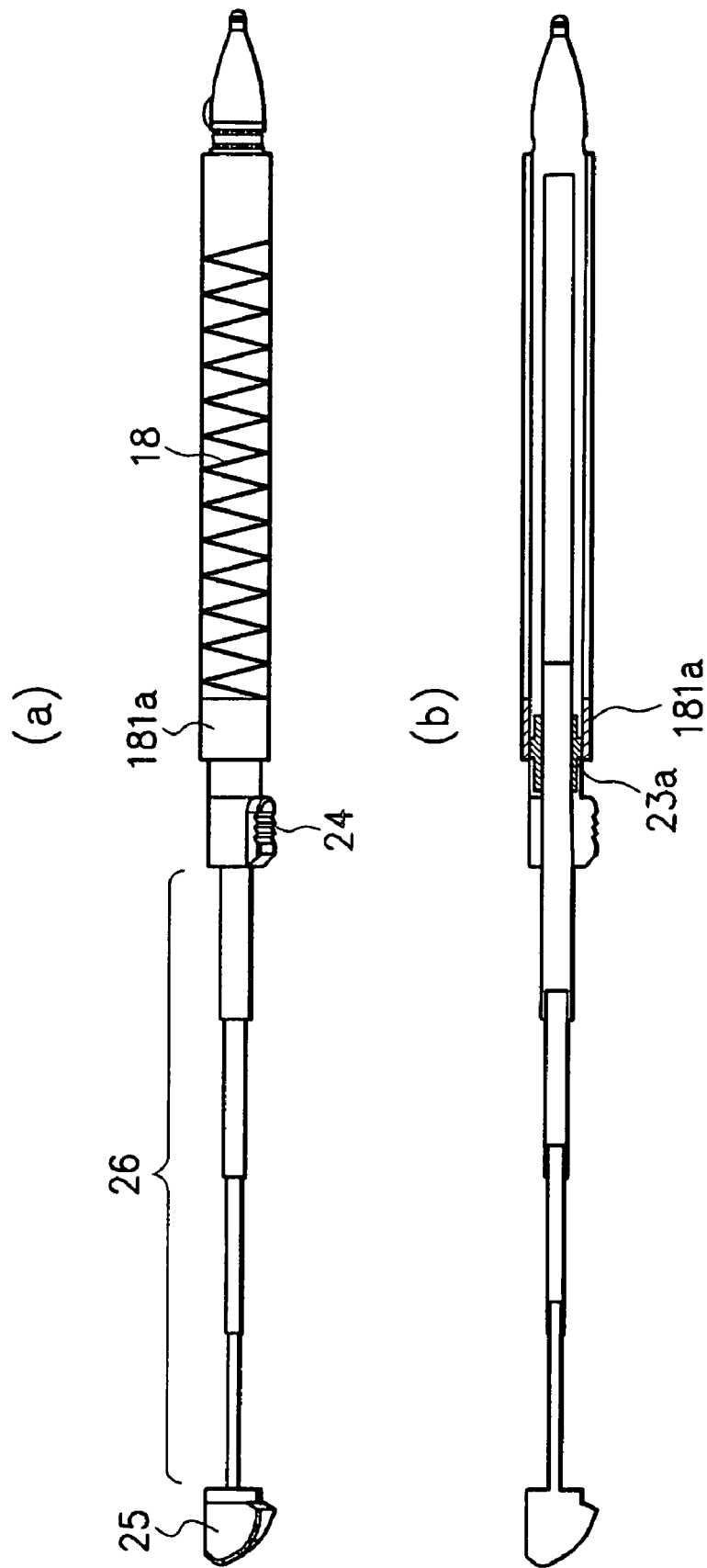
FIG. 6 is a diagram showing the TV antenna with function as an input pen 2 is mounted on the mounting portion 181 when the multistage antenna section is extended.

As shown in FIGS. 4, 5 (a) and 6 (a), the TV antenna with function as an input pen 2 comprises an input end portion (contact input portion) 21 at the tip contacted with the display/input section 11 for providing input by pressure, an fixing portion (movement lock concavity) 22 for preventing the TV antenna 2 from improperly falling off the main body while it is used as the antenna, a pen body 23 for the user to hold it as the input pen by his/her hand, an antenna extending and contracting operation convexity 24 provided on the pen body 23 as a convexity for facilitating extension and contraction of the antenna, an antenna extending and contracting operation member (operational member) 25 for performing extension and contraction operation such as stretching the antenna, and a multistage antenna section 26 for functioning as a Whip/Rod TV antenna when extended.

The input end portion 21 is contacted with the display/input section 11 to press it when the TV antenna with function as an input pen 2 is detached from the main body to be used as the input pen. The input end portion 21 may be made of the same material as used for the fixing portion 22 and pen body 23.

On the antenna extending and contracting operation member 25 are formed an mounting operation portion (pushing portion) 25a for pushing the TV antenna with function as an input pen 2 into the main body in a longitudinal direction of the TV antenna and an antenna extending operation projection 25b for extending and contracting the antenna when the TV antenna is mounted on the main body.

Figure 7:
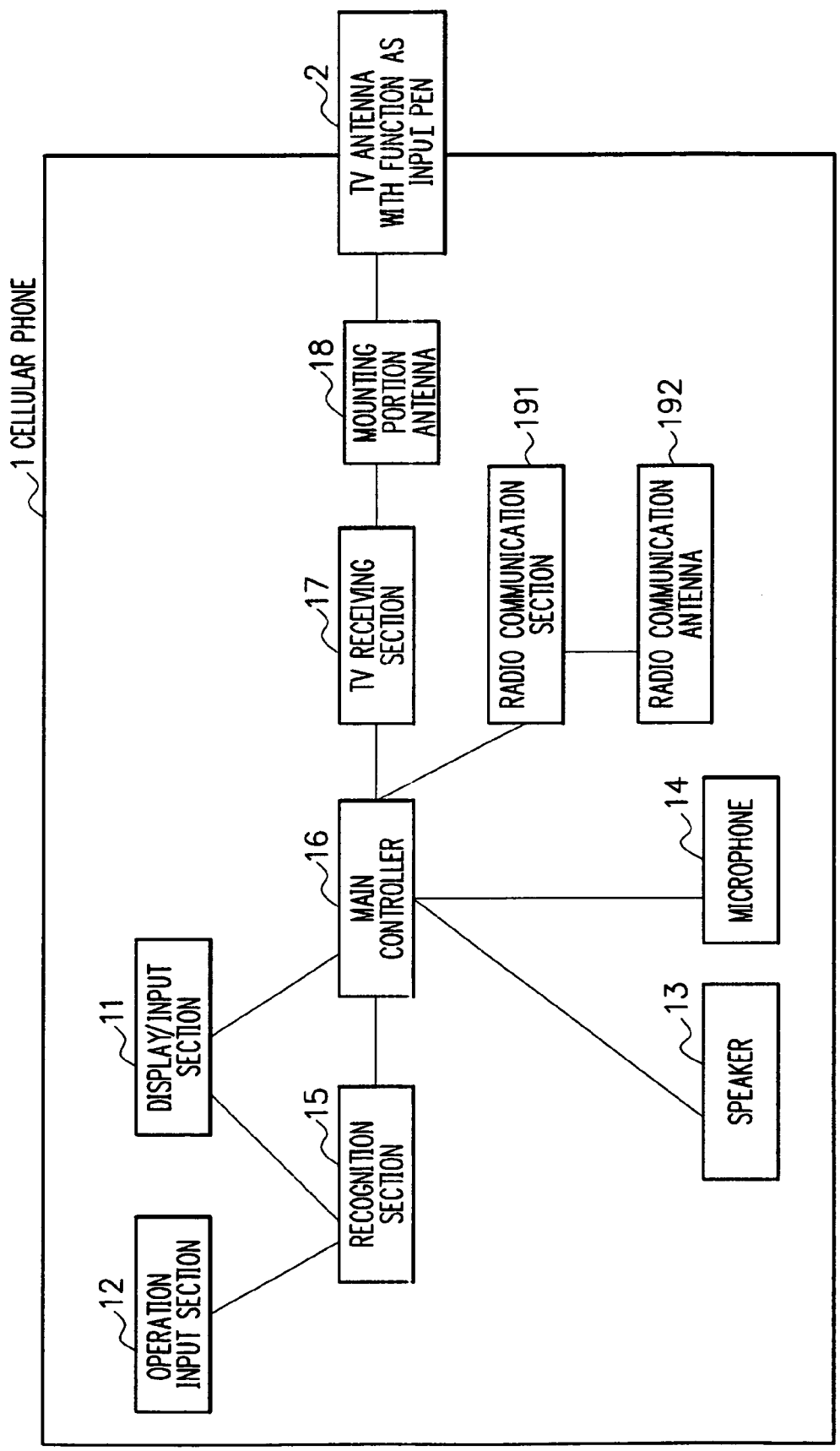
FIG. 7 is a block diagram showing the configuration of the cellular phone according to the first embodiment of the present invention.

FIG. 7 is a block diagram showing the configuration of the cellular phone 1.

As shown in FIG. 7, the cellular phone 1 of this embodiment comprises, in addition to the above-mentioned components, a recognition section 15 for recognizing input contents, a main controller 16 for controlling the entire cellular phone 1, a TV receiving section 17, a mounting portion antenna 18, a radio communication section 191 and a radio communication antenna 192.

If the display/input section 11 detects a handwriting input operation to the touch panel surface with a sensor using pressure, static electricity or the like, the recognition section 15 receives the detected input information to identify structural characteristics of input characters, numbers, etc., and collates and associates them with the characters and numbers registered in a character/number library in the cellular phone 1 so as to add positional information on the touch panel provided by a handwriting operation and interpret meaning of the handwriting input operation.

The TV receiving section 17 selects a channel and restores video and voice signals from a TV signal received by the TV receiving antenna.

Figure 8:
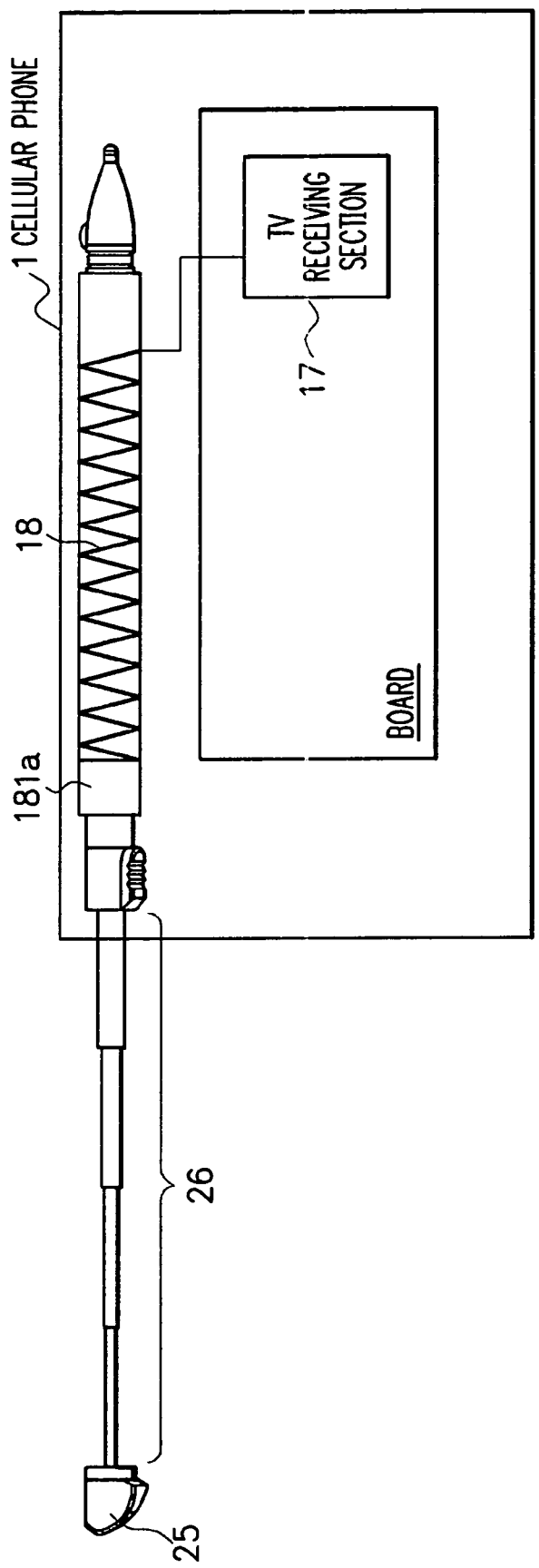
FIG. 8 is a diagram showing the TV antenna with function as an input pen 2 functioning as a TV receiving antenna.

The TV receiving antenna of the cellular phone 1 is configured of the mounting portion antenna 18 and the TV antenna with function as an input pen 2 as shown in FIGS. 7 and 8. More specifically, the multistage antenna section 26 of the TV antenna with function as an input pen 2 is connected to the mounting portion antenna 18 via an antenna connection terminal 23a and a mounting portion side connection terminal 181a while the TV antenna is inserted in the main body as shown in FIG. 9. Since the mounting portion antenna 18 is connected to the TV receiving section 17, the mounting portion antenna 18 and the TV antenna with function as an input pen 2 function as the TV receiving antennas.

As shown in an enlarged sectional view of FIG. 9, when the TV antenna with function as an input pen 2 is mounted on the main body, the connection between the multistage antenna section 26 and the mounting portion antenna 18 is such that the outer surface of the metallic multistage antenna section 26 contacts an inner surface of the antenna connection terminal 23a, and that the antenna connection terminal 23a contacts the mounting portion side connection terminal 181a which is a metallic portion of a mounting portion 181.

The mounting portion antenna 18 connected to the mounting portion side connection terminal 181a is connected to the TV receiving section 17 at the opposite end as shown in FIG. 8 so that the multistage antenna section 26 and mounting portion antenna 18 are connected to the TV receiving section 17 to function as the TV receiving antenna.

As shown in FIGS. 5 (b) and 6 (a), the mounting portion antenna 18 is a coil antenna wound around periphery of the mounting portion 181 to mount the TV antenna with function as an input pen 2 on the main body. The sum of the lengths of the mounting portion antenna 18 and the multistage antenna section 26 of the TV antenna with function as an input pen 2 provides an optimal length for the TV receiving antenna to improve receiving efficiency.

The proper length of the TV receiving antenna is different depending on various factors such as whether VHF (Very High Frequency) or UHF (Ultra High Frequency) is received. The user fine-tunes the length by extending or contracting the multistage antenna section 26. Thereby, the antenna can be adjusted to have the optimal length according to a radio wave reception state.

The user may adjust the antenna to have the optimal length by viewing a TV image displayed on the display/input section 11 or having the display/input section 11 display an indicator for adjustment. The optimal length may be obtained according to various methods, the extension or contraction by the user being given as an example, such as a motor-operating or fixing method.

The multistage antenna section 26 is configured by concentrically combining a plurality of metallic cylindrical bodies to be extendable and contractible. The antenna extending and contracting operation member 25 is provided at the end of the cylindrical body with the smallest radius in the concentric circles. Besides, the outer surface of the cylindrical body with the largest radius in the concentric circles contacts the inner surface of the antenna connection terminal 23a as described above.

The cylindrical bodies are contracted to be accommodated in the pen body 23 corresponding to the cylindrical body portion of the TV antenna with function as an input pen 2.

The input end portion 21, the fixing portion 22, the pen body 23 and the mounting portion 181 are made of insulating material such as plastic. More specifically, the portions configured integrally with the input end portion 21 of the TV antenna with function as an input pen 2 are made of insulating material except for the antenna connection terminal 23a as a contact portion for making the mounting portion antenna 18 and multistage antenna section 26 function as the TV receiving antennas.

It is thereby possible to prevent unnecessary static electricity from being brought into the main body from outside as much as possible when the TV antenna with function as an input pen 2 is inserted into the main body.

The TV receiving antenna and the radio communication antenna 192 for radio communication other than TV receiving such as a call on the cellular phone are separately provided. Thus, it is possible to secure good radio sensitivity as to both the radio communications through the antennas with different optimal lengths.

The radio communication section 191 performs radio transmission and reception of data via the radio communication antenna 192 under the control of the main controller 16 so as to implement various known functions of the cellular phone, such as a call function, a mail function and a data communication function.

Figure 10:
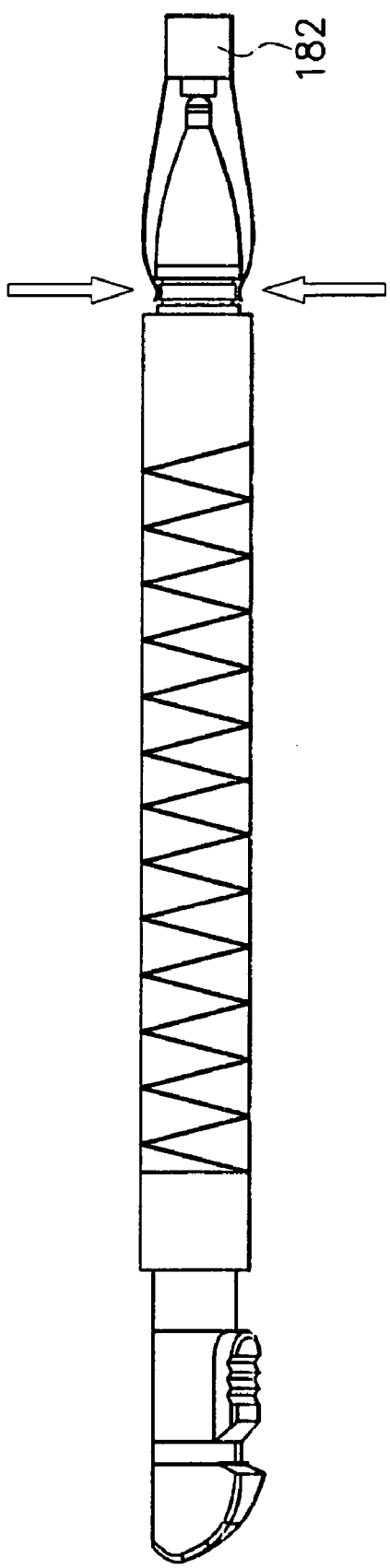
FIG. 10 is a diagram showing the TV antenna with function as an input pen 2 being sandwiched and supported by a latch switch 182.

When mounted on the main body, as shown in FIG. 10, the TV antenna with function as an input pen 2 is sandwiched and fixed by a latch switch 182 having a latch mechanism in the direction indicated by arrows (direction substantially vertical to the longitudinal direction of the TV antenna 2).

Figure 11:
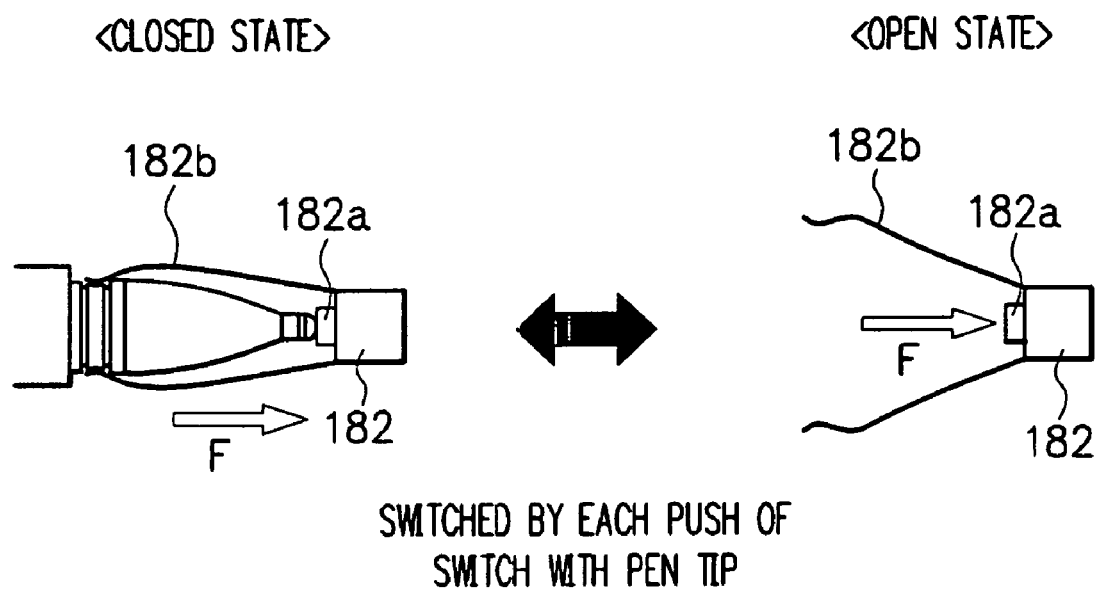
FIG. 11 is a diagram for describing the operation of the latch switch 182.

As shown in FIG. 11, the latch switch 182 is configured to allow a sandwiching member 182b to switch between open state and closed state alternately each time a push switch 182a provided at the center of the surface on the sandwiching member 182b side is pushed.

When the TV antenna with function as an input pen 2 is inserted and pushed as far as possible into the main body and mounted thereon, the input end portion 21 pushes the push switch 182a of the latch switch 182 in the open state. Therefore, the latch switch 182 is put in the closed state, and the TV antenna with function as an input pen 2 is sandwiched by the sandwiching member 182b at the fixing portion 22 in the direction indicated by arrows as shown in FIG. 10. Thus, the slide movement of the TV antenna with function as an input pen 2 in the longitudinal direction is limited, and it is supported against the main body so as not to fall off improperly even if various operations such as antenna extension are performed.

More specifically, the latch switch 182 is configured so that, if put in the closed state as described above, the sandwiching member 182b is fixed in a state of sandwiching and supporting the TV antenna with function as an input pen 2. Therefore, in the closed state, the TV antenna with function as an input pen 2 can be pushed into the main body while it cannot be pulled out therefrom.

If the TV antenna with function as an input pen 2 is pushed as far as possible into the main body in the longitudinal direction when sandwiched and supported by the latch switch 182 and mounted on the main body, the input end portion 21 pushes the push switch 182a of the latch switch 182 in the closed state. Therefore, the latch switch 182 is put in the open state, and the lock by the sandwiching member 182b at the fixing portion 22 is released. At the same time, the TV antenna with function as an input pen 2 is ejected to the outside of the main body in the longitudinal direction in reaction to the push switch 182a pushed back. Therefore, at least a part of the TV antenna with function as an input pen 2 pops out of the main body so that the user can easily pull out the TV antenna 2.

Next, a description will be given of the operation on the cellular phone 1 of this embodiment to manipulate the TV antenna with function as an input pen 2 for performing various operations, such as extending the TV receiving antenna to watch TV and providing handwriting input with the input pen.

Figure 12:
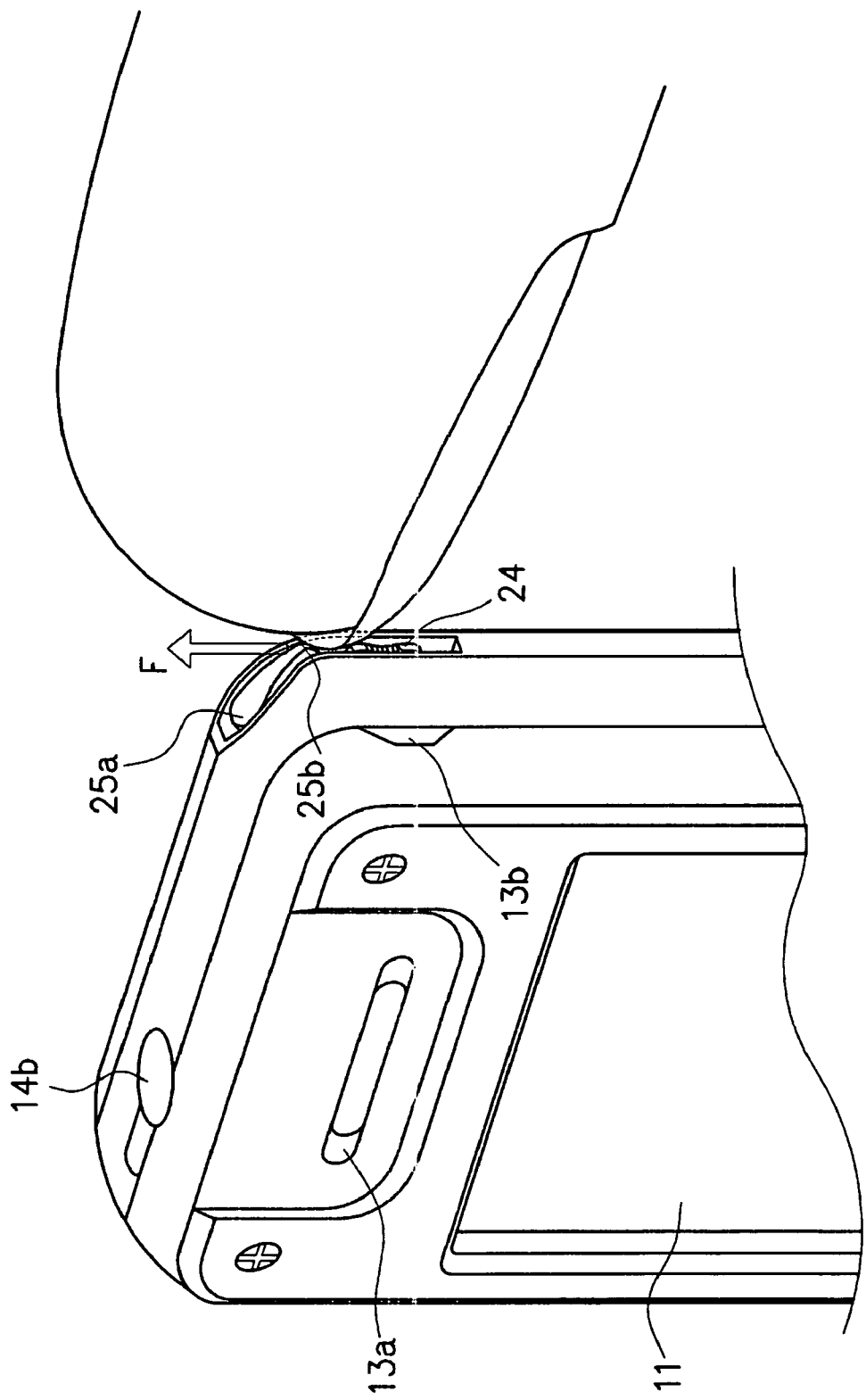
FIG. 12 is a diagram showing the operation to extend the TV antenna with function as an input pen 2 for use as the TV receiving antenna.

First, as shown in FIG. 12, in the case of using the TV antenna with function as an input pen 2 as the TV receiving antenna, the antenna extending operation projection 25b is pulled up by applying force F thereto with a fingernail in the direction indicated by arrow. Then, the antenna extending and contracting operation member 25 is held and slid so as to extend the multistage antenna section 26 housed in the pen body 23.

Thus, the multistage antenna section 26 is extended and connected to the mounting portion antenna 18 via the antenna connection terminal 23a and mounting portion side connection terminal 181a as described above. Further, the mounting portion antenna 18 is connected to the TV receiving section 17, and a TV wave is electrically transmitted from the TV antenna with function as an input pen 2 and mounting portion antenna 18 to the TV receiving section 17.

When the user performs necessary operation to view the TV image, and the TV image is displayed on the display/input section 11, the user can adjust the reception state by adjusting the length of the multistage antenna section 26 according to the display state.

Figure 13:
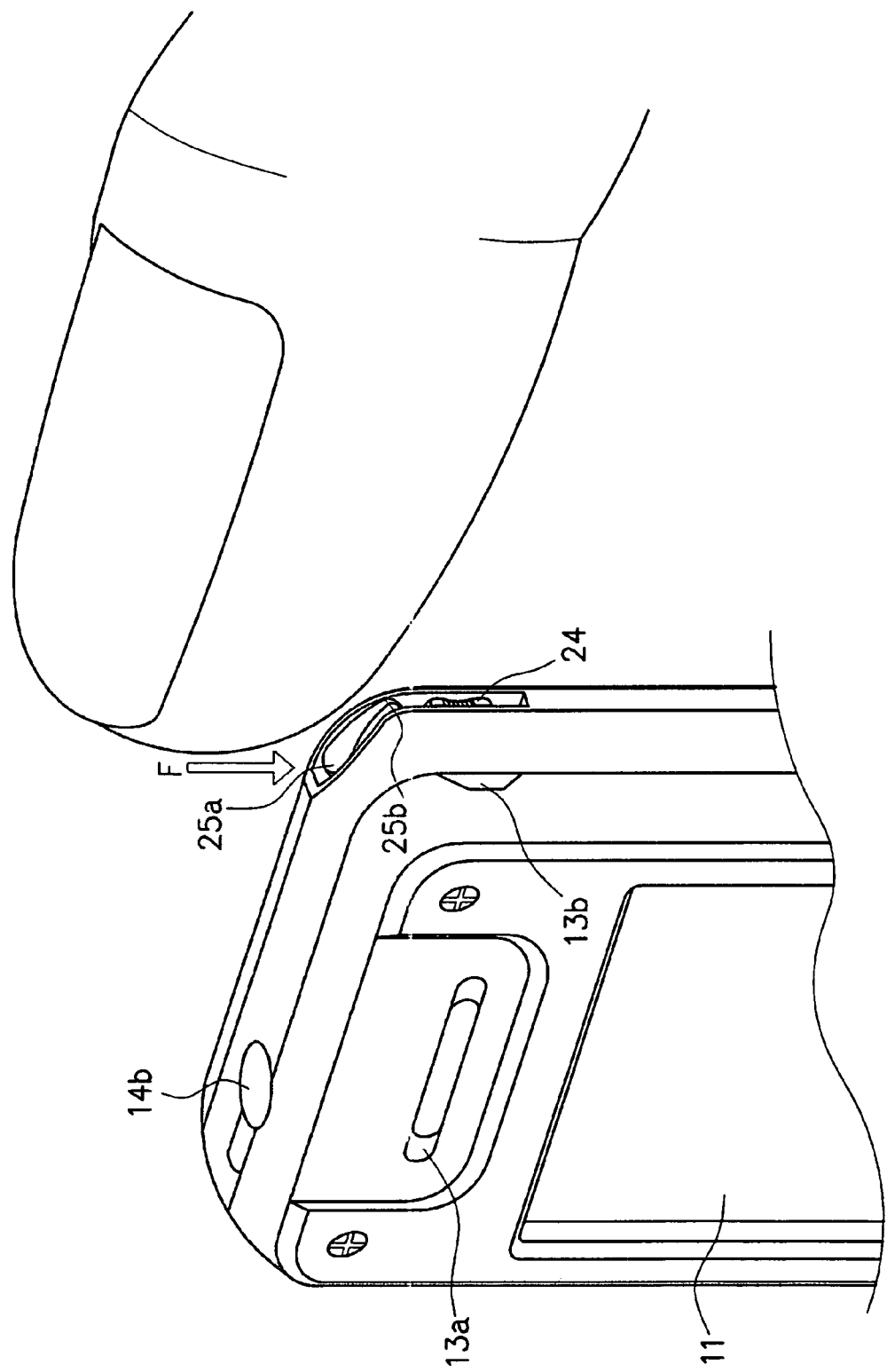
FIG. 13 is a diagram showing the pushing operation to use the TV antenna with function as an input pen 2 as the input pen.

In the case of using the TV antenna with function as an input pen 2 as the input pen, as shown in FIG. 13, the mounting operation portion 25a exposed from the main body as the end portion of the TV antenna 2 in the longitudinal direction is pushed with a fingertip in the direction indicated by arrow (direction to push the portion 25a into the main body in the longitudinal direction) to release the hold state (state of the TV antenna 2 being locked by the sandwiching member 182b) by the function of the latch switch 182. Thus, the TV antenna with function as an input pen 2 is pushed out and can be pulled out of the main body.

Here, in the portion configured integrally with the input end portion 21 for pushing the latch switch 182, only the antenna extending and contracting operation convexity 24 is exposed outside the main body while the TV antenna with function as an input pen 2 is mounted on the main body as shown in FIG. 1. Also, the antenna extending and contracting operation convexity 24 is exposed only in one direction incapable of being sandwiched and held so that it cannot be pushed by normal operation of the user.

Consequently, to take out the TV antenna with function as an input pen 2 by pushing it in the direction indicated by arrow in FIG. 13 and releasing the hold state by the latch switch 182 as described above, it is inevitable to push the mounting operation portion 25a in the direction to push it into the main body as normal operation of the user.

More specifically, the cellular phone of this embodiment has the configuration in which the TV antenna with function as an input pen 2 cannot be pushed to be detached from the main body unless the user contracts the multistage antenna section 26 and houses it completely in the pen body 23.

As described above, according to this embodiment, the TV antenna with function as an input pen 2 can be prevented from being improperly pulled out when used as a part of the TV receiving antenna, and further, accommodate the multistage antenna section 26 when used as the input pen for the manual input.

With this configuration, while having entirely different functions of the TV receiving antenna and the input pen, the TV antenna with function as an input pen 2 can be naturally switched between the two functions so that the user can use both the functions in an optimal state.

In addition, since the TV antenna with function as an input pen 2 has entirely different functions of the TV receiving antenna and the input pen as mentioned above, both the large-volume TV receiving antenna and the input pen do not occupy space, which allows the space in the main body to be used effectively.

Further, while doubling as the TV receiving antenna and the input pen, the TV antenna with function as an input pen 2 can be extended by pulling up the antenna extending operation projection 25b when used as the TV receiving antenna. Besides, the TV antenna with function as an input pen 2 can be pulled out of the main body just by pushing it when used as the input pen. Thus, it is possible to provide the cellular phone having the TV antenna with function as an input pen excellent in operability.

In the aforementioned first embodiment, the antenna extending and contracting operation convexity 24 is formed at the end of the antenna extending and contracting operation member 25 of the pen body 23 as shown in FIGS. 4, 5 (a) and 6 (a). However, the position of the antenna extending and contracting operation convexity 24 is not so limited, and it may be placed, for instance, at the end on the antenna extending and contracting operation member 25 side of the first node (the thickest cylindrical body) of the multistage antenna section 26 on the pen body 23 side as shown in FIG. 14.

Figure 14:
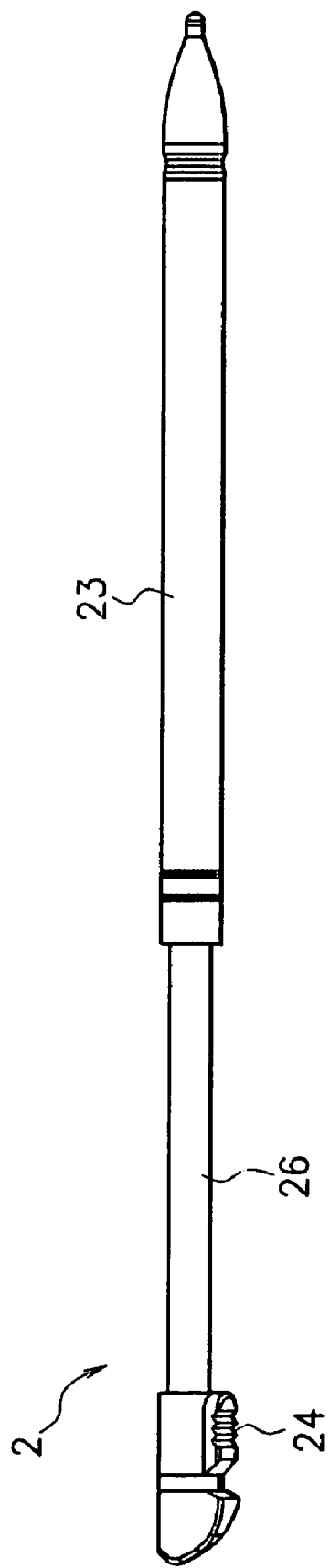
FIG. 14 is a diagram showing a example of the configuration of the TV antenna with function as an input pen 2 in which the antenna extending and contracting operation convexity 24 is placed on a first node of a multistage antenna section 26.

That is, as shown in FIG. 14, the antenna extending and contracting operation convexity 24 may be placed so as to be at the end on the antenna extending and contracting operation member 25 side even when the thickest first node of the multistage antenna section 26 is extended.

In this case, it is also possible to form the antenna extending and contracting operation convexity 24 made of a resin at the end of the first node (the thickest cylindrical body) of the metallic multistage antenna section 26 on the antenna extending and contracting operation member 25 side.

If the antenna extending and contracting operation convexity 24 is placed at the first node (the thickest cylindrical body) of the multistage antenna section 26 on the pen body 23 side, the TV antenna with function as an input pen 2 can be used suitably as the input pen for the manual input even when the thickest first node of the multistage antenna section 26 is extended.

For this reason, even in the case where the length of the TV antenna with function as an input pen 2 has to be reduced because the main body is extremely miniaturized, it is possible to ensure a suitable length as the input pen. Thus, the main body can be miniaturized, and the usability of the input pen can be improved.

Second Embodiment

Next, the second embodiment of the present invention will be described. Differently from the first embodiment in which the antenna is extended by catching the antenna extending operation projection 25b with a fingernail, etc., in the second embodiment, the antenna extending and contracting operation member juts out of the main body.

The cellular phone of the second embodiment is basically similar in configuration to that of the first embodiment except for the periphery of the antenna extending and contracting operation member, and the same description will not be repeated.

Figure 15:
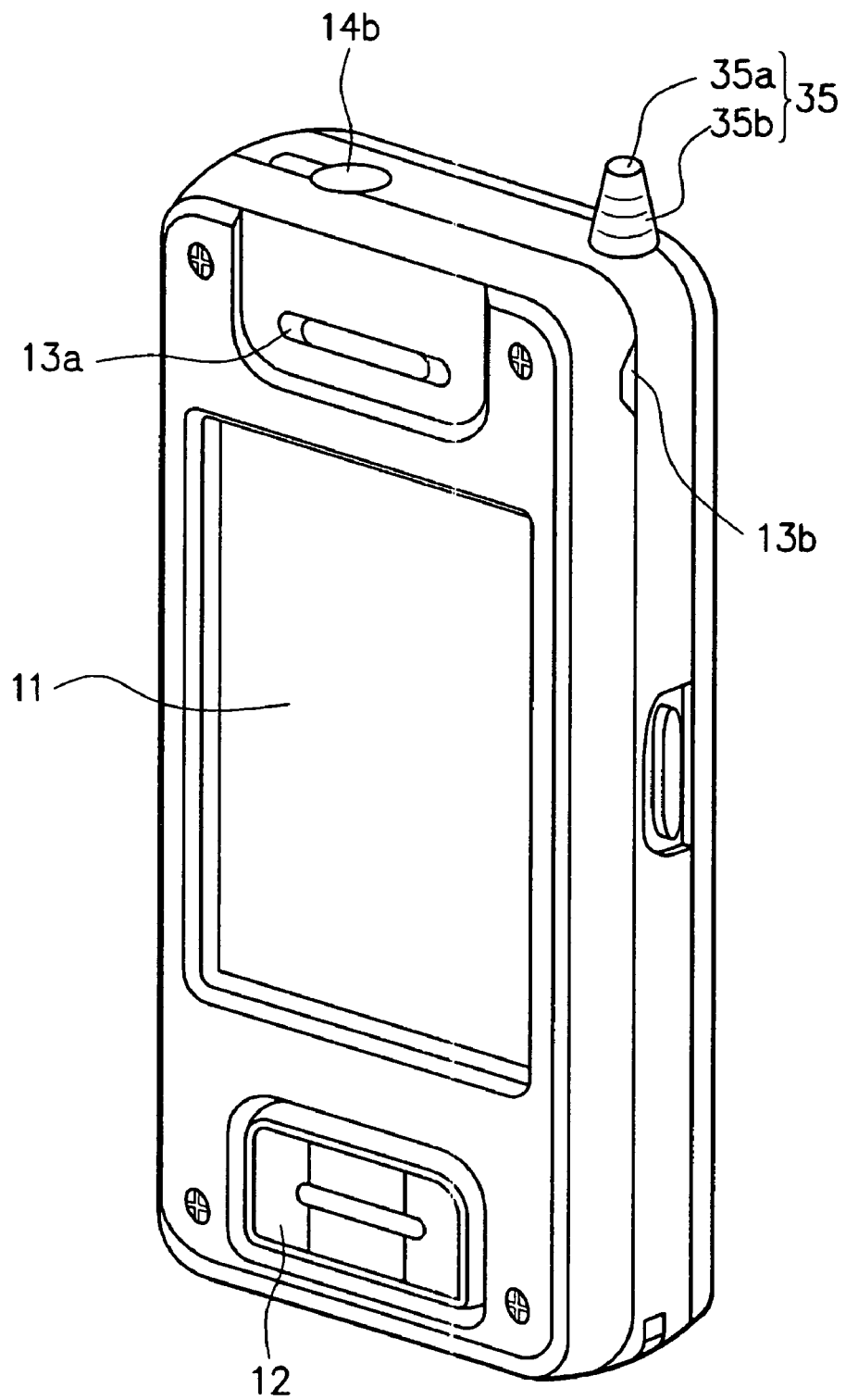
FIG. 15 is a perspective view showing an example of the appearance of a cellular phone according to the second embodiment of the present invention.
Figure 16A:
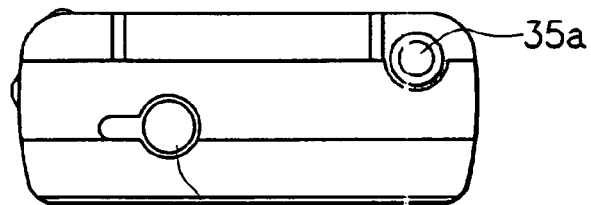
FIG. 16 (a) is a plan view of the cellular phone.
Figure 16B:
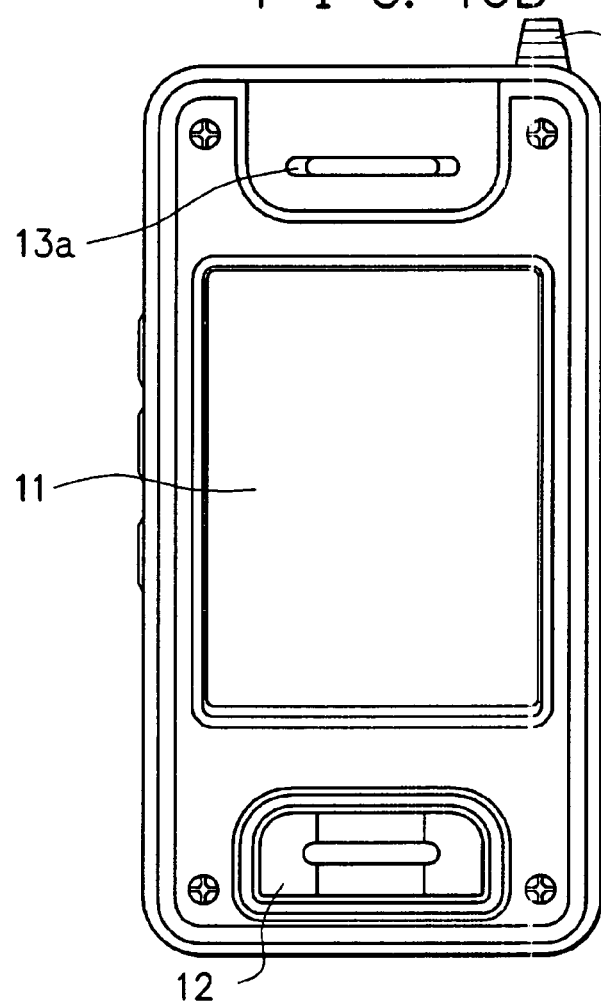
Figure 16D:
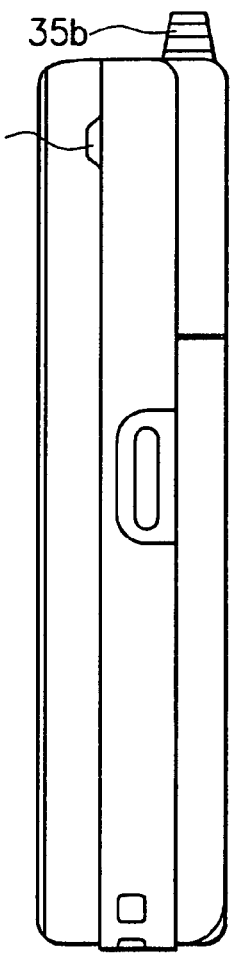
Figure 16C:
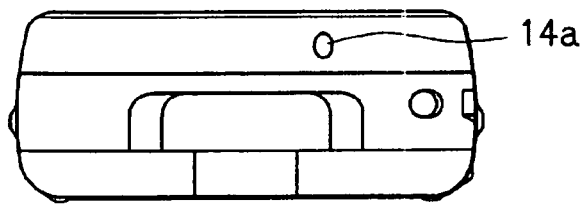

As shown in FIGS. 15 and 16, the cellular phone of the second embodiment has a configuration in which an antenna extending and contracting operation member 35 of a TV antenna with function as an input pen 3 juts out of the main body to be pulled up directly by pinching it with fingertips.

The TV antenna with function as an input pen 3 of the second embodiment also has the same configuration as that of the first embodiment except the omission of the antenna extending and contracting operation convexity 24 and the periphery of the antenna extending and contracting operation member 35. Therefore, like reference characters will refer to corresponding portions, and the same description will not be repeated.

Next, a description will be given of the operations on manipulating the TV antenna with function as an input pen 3 for performing various operations, such as extending the TV receiving antenna to watch TV and providing handwriting input with the input pen.

First, as shown in FIG. 17, in the case of using the TV antenna with function as an input pen 3 as the TV receiving antenna, an antenna extending operation portion 35b of the antenna extending and contracting operation member 35 is directly pinched with fingertips to pull up and slide it by applying force F in the direction indicated by arrow so as to extend the multistage antenna section 26 housed in the pen body 23.

In this manner, the multistage antenna section 26 is extended and thereby connected to the mounting portion antenna 18 via the antenna connection terminal 23a and mounting portion side connection terminal 181a as in the first embodiment. The mounting portion antenna 18 is also connected to the TV receiving section 17, and a TV wave is electrically transmitted from the TV antenna with function as an input pen 3 and the mounting portion antenna 18 to the TV receiving section 17.

When the user performs the necessary operation to view the TV image, and the TV image is displayed on the display/input section 11, the user can adjust the reception state by adjusting the length of the multistage antenna section 26 according to the display state.

Figure 18:
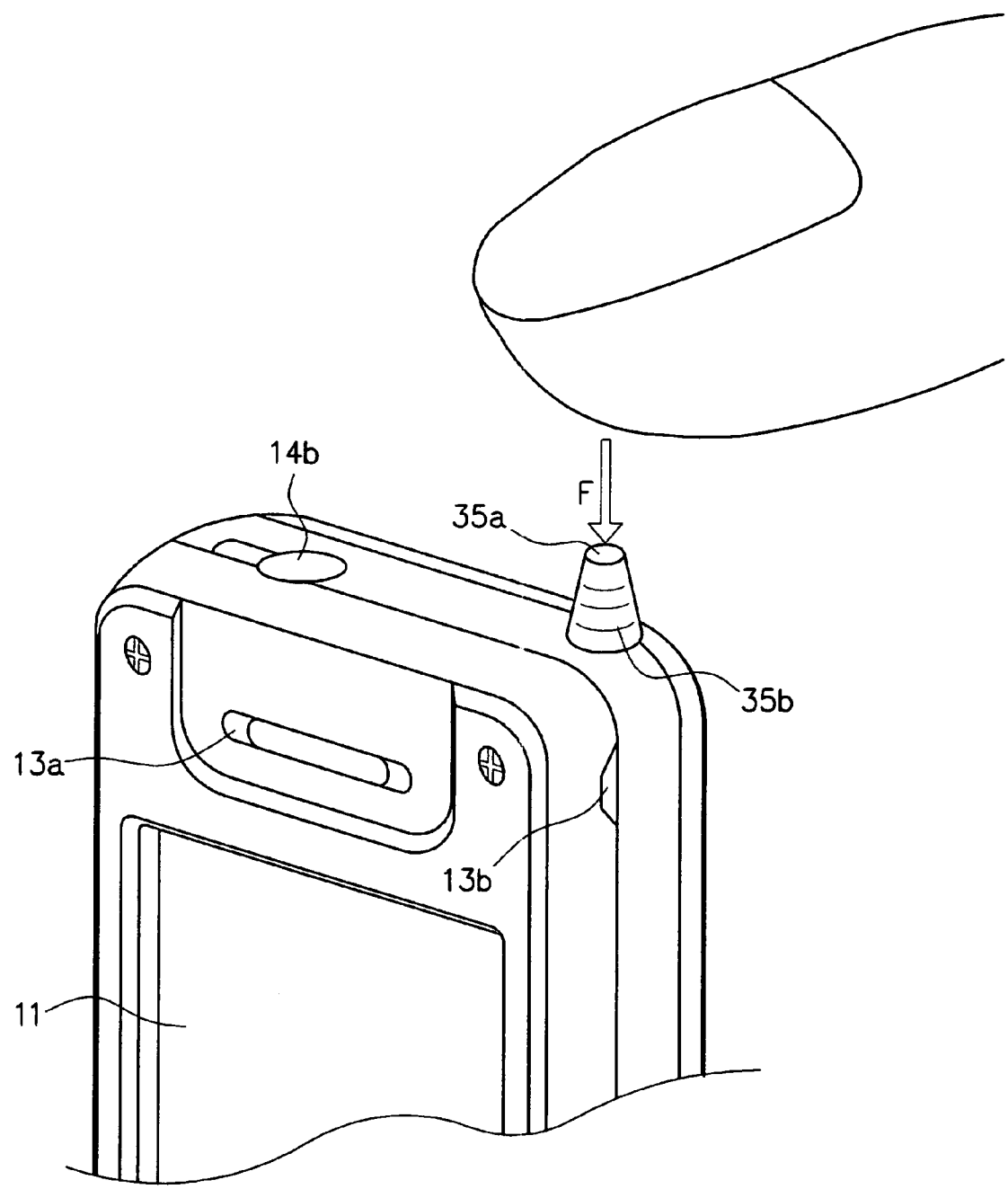
FIG. 18 is a diagram showing the pushing operation to use the TV antenna with function as an input pen 3 as an input pen.

In the case of using the TV antenna with function as an input pen 3 as the input pen, as shown in FIG. 18, the mounting operation portion 35a as the end portion of the TV antenna 3 in the longitudinal direction is pushed with a fingertip in the direction indicated by arrow (direction to push the portion 35a into the main body in the longitudinal direction) to release the TV antenna 3 from the hold state (state of being locked by the sandwiching member 182b) by the function of the latch switch 182 as in the first embodiment. Thus, the TV antenna with function as an input pen 3 is pushed out and can be pulled out of the main body.

Here, the portion making no movement against the input end portion 21 for pushing the latch switch 182 by extension and contraction of the antenna is not exposed outside the main body while the TV antenna with function as an input pen 3 is mounted on the main body. Therefore, to take out the TV antenna with function as an input pen 3 by pushing it in the direction indicated by arrow in FIG. 18 to thereby release the hold state by the latch switch 182 as described above, it is inevitable to push the mounting operation portion 25a in the direction to push it into the main body as a normal operation of the user.

In other words, the TV antenna with function as an input pen 3 cannot be pushed to be detached from the main body unless the user contracts the multistage antenna section 26 and houses it completely in the pen body 23.

As described above, according to the second embodiment, the TV antenna with function as an input pen 3 can be prevented from being improperly pulled out when used as a part of the TV receiving antenna, and further, accommodate the multistage antenna section 26 when used as the input pen for the manual input.

With this configuration, while having entirely different functions of the TV receiving antenna and the input pen, the TV antenna with function as an input pen 3 can be naturally switched between the two functions so that the user can use both the functions in an optimal state.

In addition, since the TV antenna with function as an input pen 3 has entirely different functions of the TV receiving antenna and the input pen as mentioned above, both the large-volume TV receiving antenna and the input pen do not occupy space, which allows the space in the main body to be used effectively.

Further, while functioning as the TV receiving antenna and the input pen, the TV antenna with function as an input pen 3 can be extended just by directly pinching and pulling up the antenna extending and contracting operation member 35 with fingertips when used as the TV receiving antenna. Besides, the TV antenna with function as an input pen 2 can be pulled out of the main body just by pushing it when used as the input pen. Thus, it is possible to provide the cellular phone having the TV antenna with function as an input pen excellent in operability.

Third Embodiment

Next, the third embodiment of the present invention will be described. Differently from the first embodiment in which the antenna is extended by catching the antenna extending operation projection 25b with a fingernail, etc., in the third embodiment, only the mounting operation portion as the upper part of the antenna extending and contracting operation member juts out of the main body.

The cellular phone of the third embodiment is basically similar in configuration to that of the first embodiment except for the periphery of the antenna extending and contracting operation member, and the same description will not be repeated.

Figure 19:
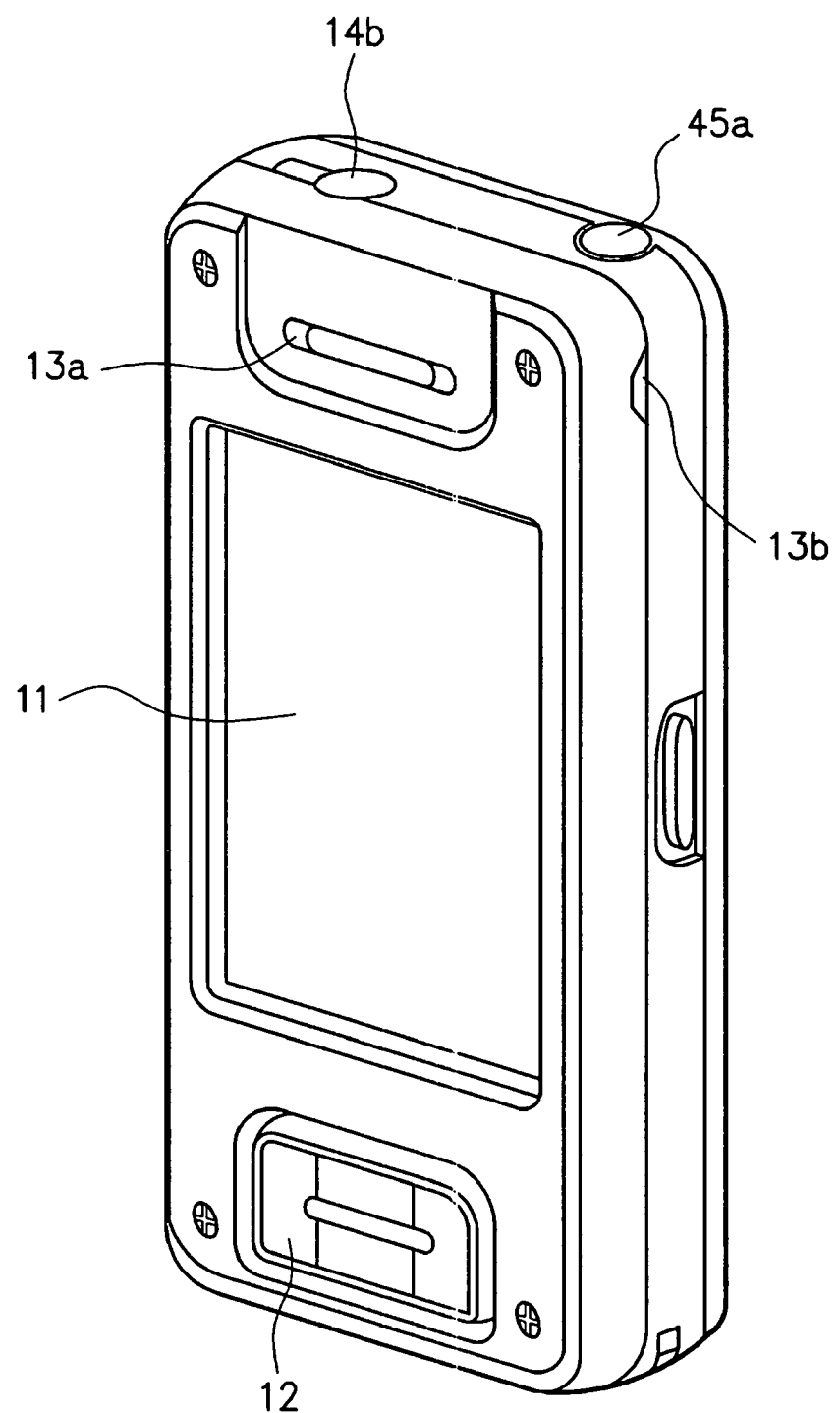
FIG. 19 is a perspective view showing an example of the appearance of a cellular phone according to a third embodiment of the present invention.
Figure 20A:
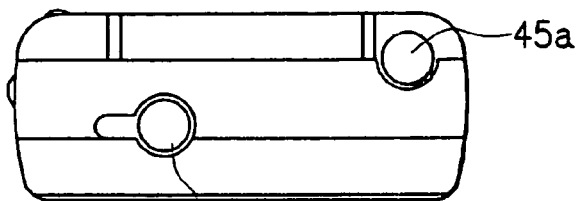
FIG. 20 (a) is a plan view of the cellular phone.
Figure 20B:
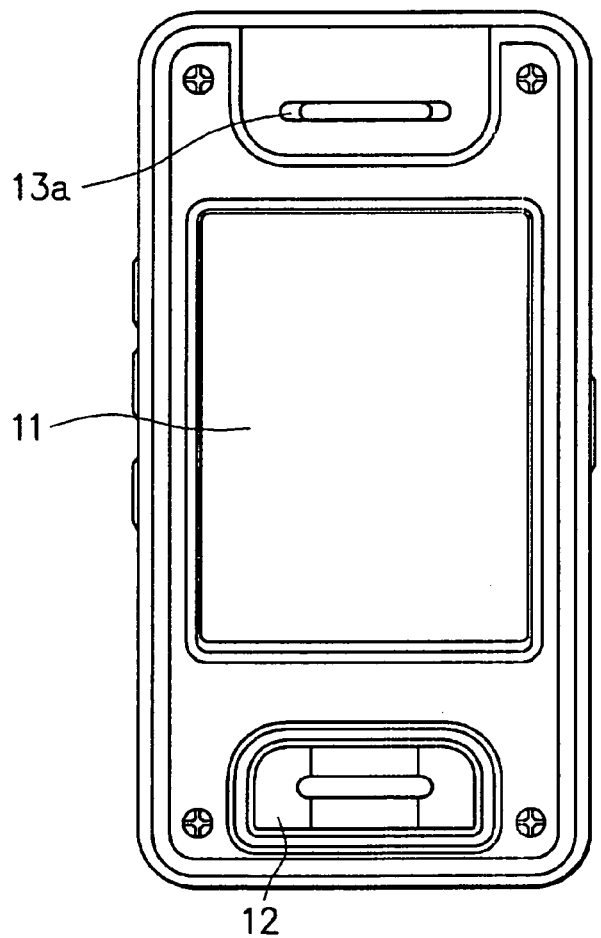
Figure 20D:
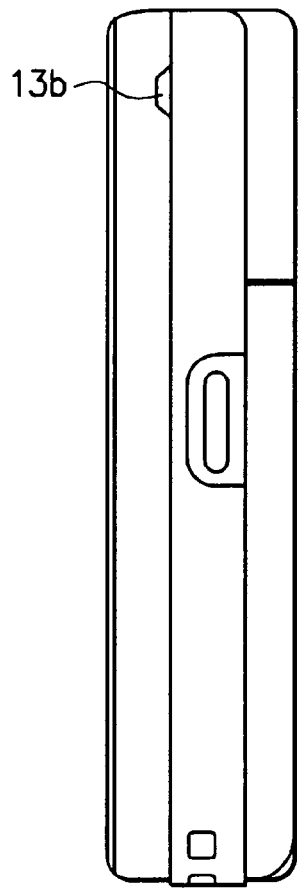
Figure 20C:
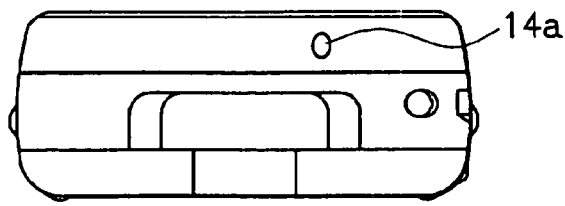
Figure 21A:
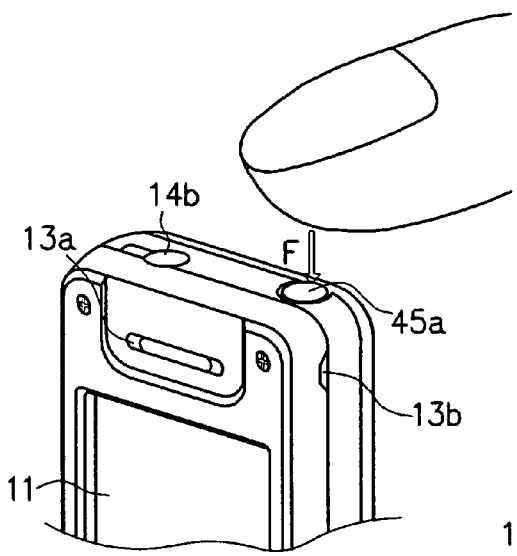
FIG. 21 (a) is a diagram showing the operation to extend a TV antenna with function as an input pen for use as the TV receiving antenna according to the third embodiment of the present invention, showing the pushing operation to release the multistage antenna section of the TV antenna from the cellular phone.
Figure 21B:
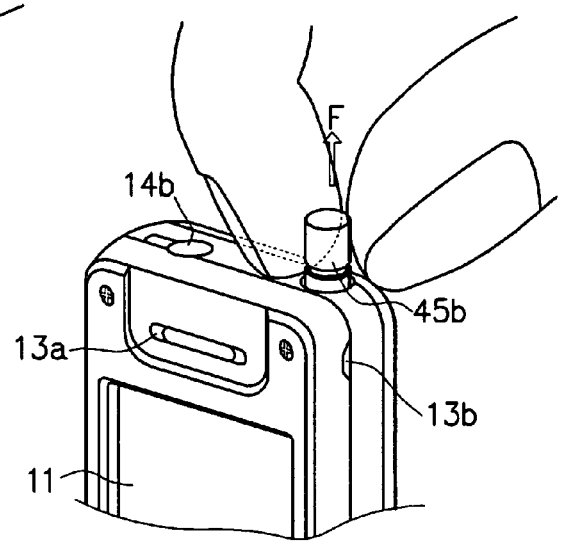
Figure 21C:
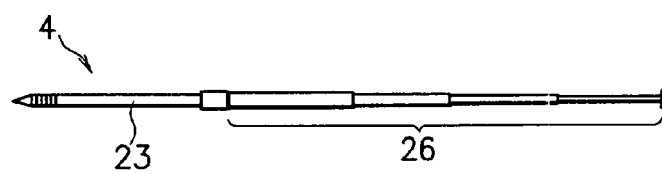
Figure 21D:
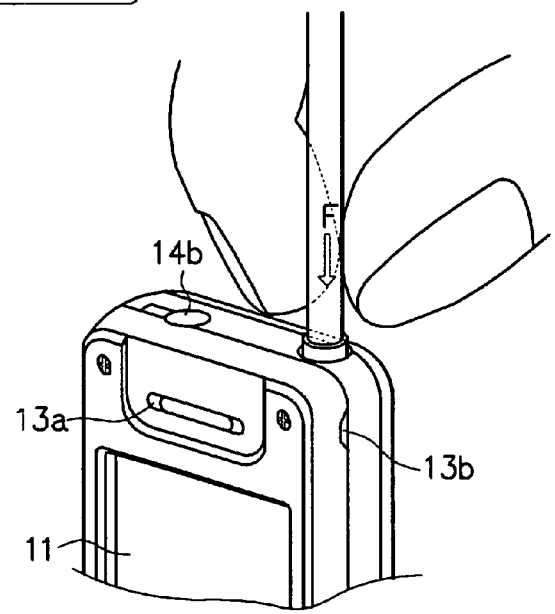

As shown in FIGS. 19 and 20, the cellular phone of the third embodiment has a configuration in which only an mounting operation portion 45a as the upper part of an antenna extending and contracting operation member 45 of a TV antenna with function as an input pen 4 is exposed outside the main body while the TV antenna 4 is mounted on the main body. Consequently, the cellular phone has an appearance of few projections and concave and convexities.

The TV antenna with function as an input pen 4 of the second embodiment also has the same configuration as that of the first embodiment except the omission of the antenna extending and contracting operation convexity 24 and the periphery of the antenna extending and contracting operation member 45. Therefore, like reference characters will refer to corresponding portions, and the same description will not be repeated.

Next, a description will be given of operations on manipulating the TV antenna with function as an input pen 4 for performing various operations, such as extending the TV receiving antenna to watch TV and providing handwriting input with the input pen for the manual input.

In the case of using the TV antenna with function as an input pen 4 as the TV receiving antenna, as shown in FIG. 21 (a), the mounting operation portion 45a of the antenna extending and contracting operation member 45 is pushed with a fingertip in the direction indicated by arrow (direction to push the portion 45a into the main body in the longitudinal direction). Force F is thereby applied to the latch switch 182, as in the first embodiment, from the mounting operation portion 45a as the end portion of the TV antenna with function as an input pen 4 in the longitudinal direction to release the TV antenna 4 from the hold state (state of being locked by the sandwiching member 182b) by the function of the latch switch 182. Accordingly, the TV antenna with function as an input pen 4 is pushed out.

The antenna extending operation portion 45b thus pushed out is directly pinched with fingertips as shown in FIG. 21 (b) to pull the TV antenna with function as an input pen 4 out of the main body, and the multistage antenna section 26 is extended as shown in FIG. 21 (c).

As shown in FIG. 21 (d), if the TV antenna with function as an input pen 4 with the multistage antenna section 26 being extended is inserted again into the main body and pushed in the direction indicated by arrow, the TV antenna 4 is mounted on the main body.

In this manner, when the TV antenna with function as an input pen 4 with the multistage antenna section 26 being extended is mounted on the main body, the multistage antenna section 26 is connected to the mounting portion antenna 18 via the antenna connection terminal 23a and the mounting portion side connection terminal 181a as in the first embodiment. The mounting portion antenna 18 is also connected to the TV receiving section 17, and a TV wave is electrically transmitted from the TV antenna with function as an input pen 4 and mounting portion antenna 18 to the TV receiving section 17.

When the user performs the necessary operation to view the TV image, and the TV image is displayed on the display/input section 11, the user can adjust the reception state by adjusting the length of the multistage antenna section 26 according to the display state.

In the case of using the TV antenna with function as an input pen as the input pen, as described above in connection with FIGS. 21 (a) and 21 (b), the TV antenna with function as an input pen 4 is pulled out of the main body, and thereby can be used as the input pen for the manual input.

As described above, also in the third embodiment, the TV antenna with function as an input pen 4 is taken out by pushing the mounting operation portion 45a as the end portion of the TV antenna 4 in the longitudinal direction with a fingertip, the TV antenna 4 cannot be pushed to be detached from the main body unless the user contracts the multistage antenna section 26 and houses it completely in the pen body 23.

Consequently, the TV antenna with function as an input pen 4 can be prevented from being improperly pulled out when used as a part of the TV receiving antenna, and further, accommodate the multistage antenna section 26 when used as the input pen for the manual input.

With this configuration, while having entirely different functions of the TV receiving antenna and the input pen, the TV antenna with function as an input pen 4 can be naturally switched between the two functions so that the user can use both the functions in an optimal state.

In addition, since the TV antenna with function as an input pen 4 has entirely different functions of the TV receiving antenna and the input pen as mentioned above, both the large-volume TV receiving antenna and the input pen do not occupy space, which allows the space in the main body to be used effectively.

Furthermore, while functioning as the TV receiving antenna and the input pen, the TV antenna with function as an input pen 4 can be pulled out of the main body just by pushing the mounting operation portion 45a. Thus, it is possible to provide the cellular phone excellent in operability and having a neat appearance of few projections and concave and convexities.

Fourth Embodiment

Next, the fourth embodiment of the present invention will be described. Differently from the first and second embodiments in which the multistage antenna section can be freely extended when the TV antenna with function as an input pen is pulled out of the main body, in the fourth embodiment, it cannot be extended when the TV antenna is pulled out of the main body and used as the input pen.

Like reference characters will refer to the same portions as those in the first embodiment, and the same description will not be repeated.

Figure 22:
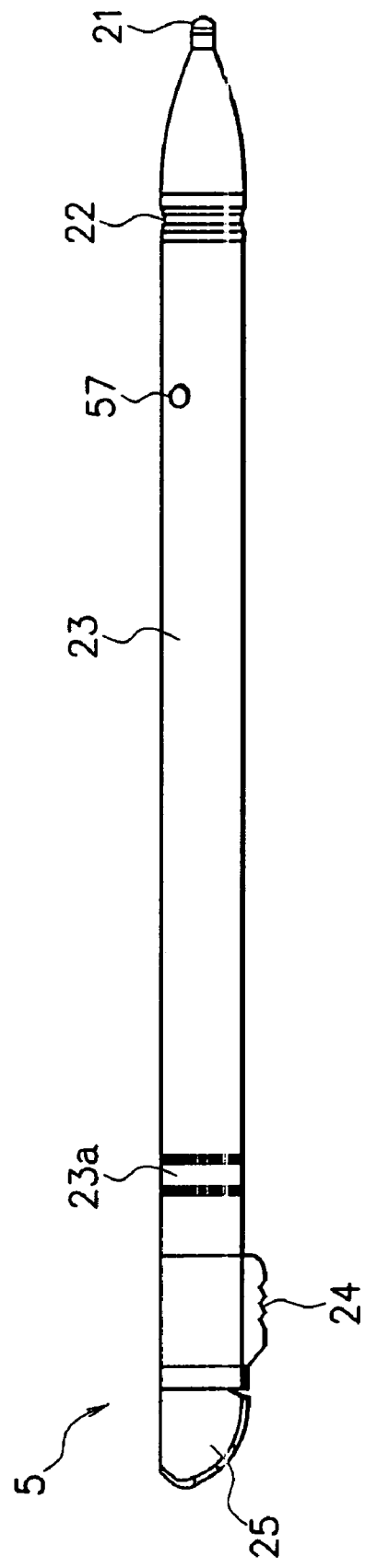
FIG. 22 is a diagram showing a TV antenna with function as an input pen 5 according to the fourth embodiment of the present invention.

The cellular phone of the fourth embodiment has a lock releasing opening 57 formed on a side of a TV antenna with function as an input pen 5 as shown in FIG. 22.

Figure 23:
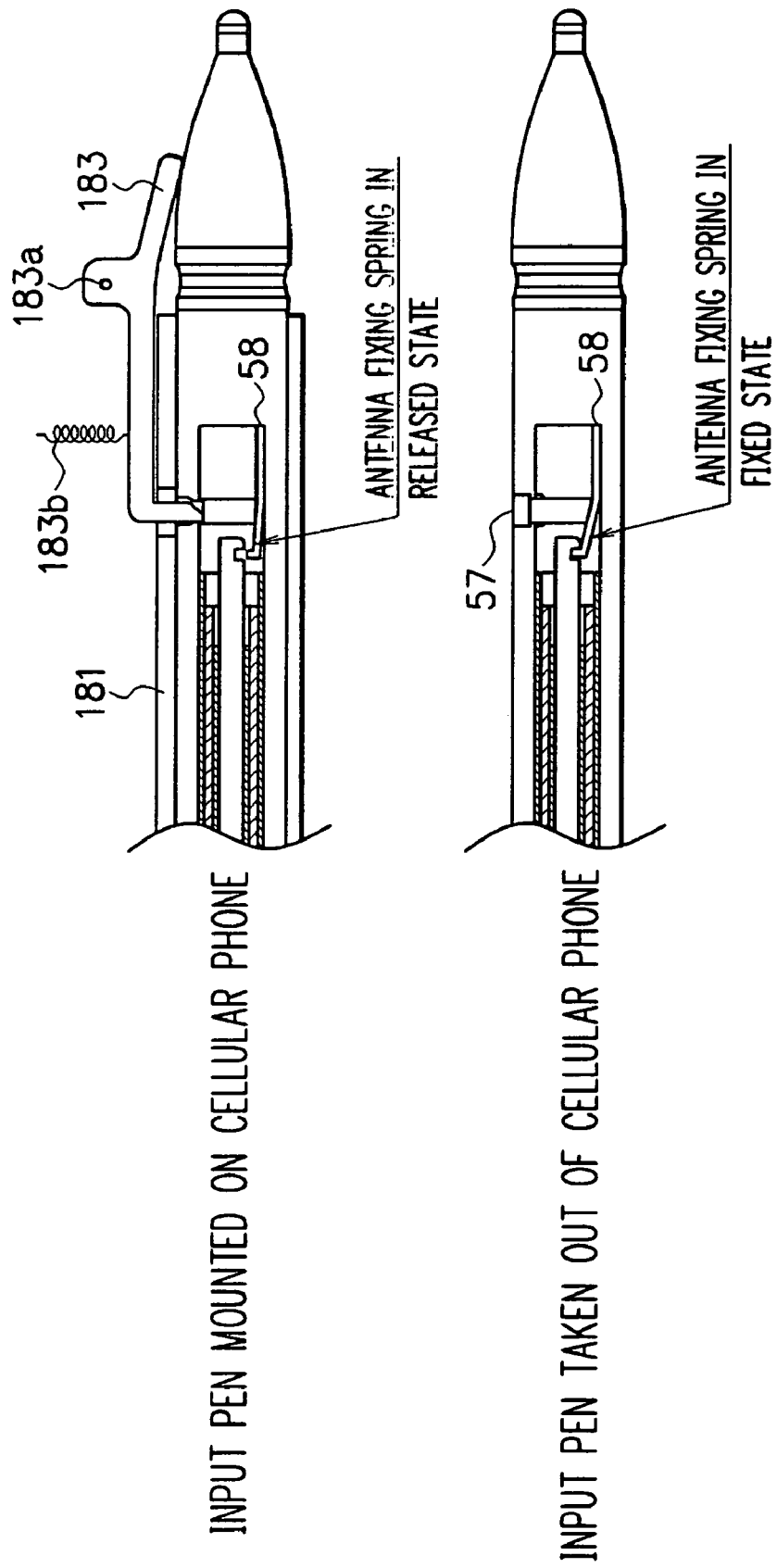
FIG. 23 is a diagram showing the action of an antenna fixing spring 58 of the TV antenna with function as an input pen 5.

As shown in FIG. 23, an antenna fixing spring 58 for locking the slide movement of an endmost node (the thinnest cylindrical body) of the multistage antenna section 26 is placed in the portion for housing the multistage antenna section 26 inside the pen body 23.

The antenna fixing spring 58 is a plate spring placed on the inner surface of the pen body 23 and charged (energized; reserving the resilience) to have elastic resilience toward the center side in the radial direction inside the cylindrical body. Due to this energization, the end portion of the antenna fixing spring 58 is pressed and pushed against a fixing concavity formed near the deepest part of the endmost node (the thinnest cylindrical body) of the multistage antenna section 26 while the TV antenna with function as an input pen 5 is detached from the main body.

Thus, the slide movement of the endmost node of the multistage antenna section 26 is locked so that the user can not extend the multistage antenna section 26.

When the TV antenna with function as an input pen 5 is mounted on the main body, the antenna fixing spring 58 is pressed by a lock releasing member 183 toward the outside in the radial direction of the pen body 23 which has a cylindrical body concentric with the multistage antenna section 26. Thus, the end portion of the antenna fixing spring 58 comes off the fixing concavity on the endmost node of the multistage antenna section 26 so as to release the lock.

Consequently, the user can freely extend the multistage antenna section 26 while the TV antenna with function as an input pen 5 is mounted on the main body.

As shown in FIG. 24, the lock releasing member 183 is rotatably supported on the main body by a rotation axis 183*a*, and charged (energized) by a spring 183*b* to have elastic resilience in a direction to move centering on the rotation axis a portion inserted into the lock releasing opening 57 (releasing end) away from the TV antenna with function as an input pen 5.

Here, as shown in FIG. 24 (*a*), the rotation axis 183*a* is placed further inside from the releasing end and the end other than it. Therefore, while the TV antenna with function as an input pen 5 is mounted on the main body, force F is exerted by the end portion of the TV antenna 5 to the end other than the releasing end of the lock releasing member 183 in the direction indicated by arrow in FIG. 24 (*a*). Force F rotates the lock releasing member 183 about the rotation axis 183*a*, and the rotational movement thereof moves the portion inserted into the lock releasing opening 57 (releasing end) of the lock releasing member 183 toward the TV antenna with function as an input pen 5. Thus, the portion inserted into the lock releasing opening 57 of the lock releasing member 183 is inserted from the lock releasing opening 57. The inserted portion presses the antenna fixing spring 58 toward the outside in the radial direction of the inner pen body 23 which has a cylindrical body so as to release the lock as described above.

The latch switch 182 is arranged to support the TV antenna with function as an input pen 5 by sandwiching the fixing portion 22 with the sandwiching member 182*b* on a plane not overlapping the plane moving due to the rotation of the lock releasing member 183 while the TV antenna 5 is mounted on the main body.

As shown in FIG. 24 (*b*), when the TV antenna with function as an input pen 5 is pulled out of the main body, the portion inserted into the lock releasing opening 57 of the lock releasing member 183 is pulled by the spring 183*b* in the direction away from the TV antenna with function as an input pen 5. Thus, the inserted portion is pulled out of the lock releasing opening 57, and lock is activated by the resilience of the antenna fixing spring 58. Also, the TV antenna with function as an input pen 5 is smoothly pulled out.

As described above, according to the fourth embodiment, the lock by the antenna fixing spring 58 is released and the multistage antenna section 26 can be freely expanded and contracted by the user while the TV antenna with function as an input pen 5 is mounted on the main body. On the other hand, when the TV antenna with function as an input pen 5 is pulled out of the main body to be used as the input pen, the lock is activated by the resilience of the antenna fixing spring 58 so that the user cannot expand the multistage antenna section 26.

With this configuration, while having entirely different functions of the TV receiving antenna and the input pen, the user can use both the functions in an optimal state.

In addition, by limiting unnecessary expansion and contraction of the TV antenna with function as an input pen 5 used as the input pen, it is possible to improve operability for the user and prevent damage or the like due to unnecessary expansion.

Further, as in the first and second embodiments, the TV antenna with function as an input pen 5 cannot be pushed to be detached from the main body unless the user contracts the multistage antenna section 26 and houses it completely in the pen body 23. Consequently, the TV antenna with function as an input pen 5 can be prevented from being improperly pulled out when used as a part of the TV receiving antenna.

For this reason, the TV antenna with function as an input pen 5 is prevented from being improperly pulled out or unnecessarily extended when used as either the TV receiving antenna or the input pen. Thus, it is possible to provide an optimal state of use to the user whichever function is used.

Fifth Embodiment

Next, the fifth embodiment of the present invention will be described. Differently from the fourth embodiment in which the multistage antenna section cannot be extended at all when the TV antenna with function as an input pen is pulled out of the main body and used as the input pen, in the fifth embodiment, only one node of the TV antenna can be extended when used as the input pen.

Like reference characters will refer to the same portions as those in the first and forth embodiments, and the same description will not be repeated.

Figure 25:
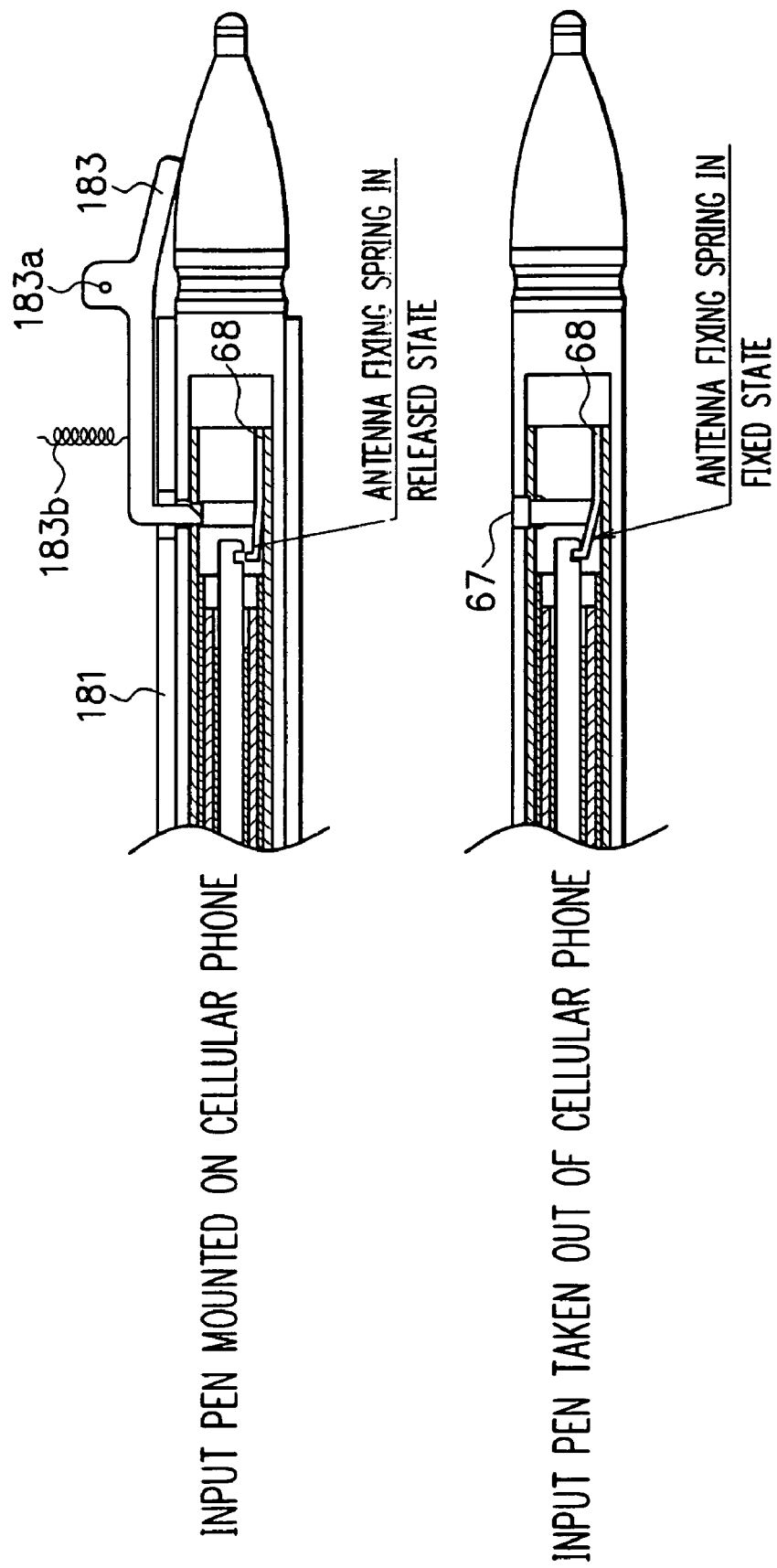
FIG. 25 is a diagram showing the action of an antenna fixing spring 68 according to a fifth embodiment of the present invention.

The cellular phone of the fifth embodiment has a lock releasing opening 67 formed on a side of a TV antenna with function as an input pen 6 as described above in connection with FIG. 22. As shown in FIG. 25, the lock releasing member 183 is inserted in the first node (the thickest cylindrical body) of the multistage antenna section 26 through the lock releasing opening 67.

As shown in FIG. 25, an antenna fixing spring 68 for locking the slide movement of the endmost node (the thinnest cylindrical body) of the multistage antenna section 26 is placed on the inner surface of the first node (the thickest cylindrical body) of the section 26.

The antenna fixing spring 68 is a plate spring charged (energized) toward the center side in the radial direction inside the first node (the thickest cylindrical body) of the multistage antenna section 26. Due to the energization of the plate spring, the end portion of the antenna fixing spring 68 is pressed and pushed against the fixing concavity formed near the deepest portion of the endmost node (the thinnest cylindrical body) of the multistage antenna section 26 while the TV antenna with function as an input pen 6 is detached from the main body.

Thus, when the TV antenna with function as an input pen 6 is taken out of the main body and used as the input pen, the slide movement of the endmost node of the multistage antenna section 26 is locked so that the user can not extend the multistage antenna section 26 except the first node (the thickest cylindrical body).

Figure 26:
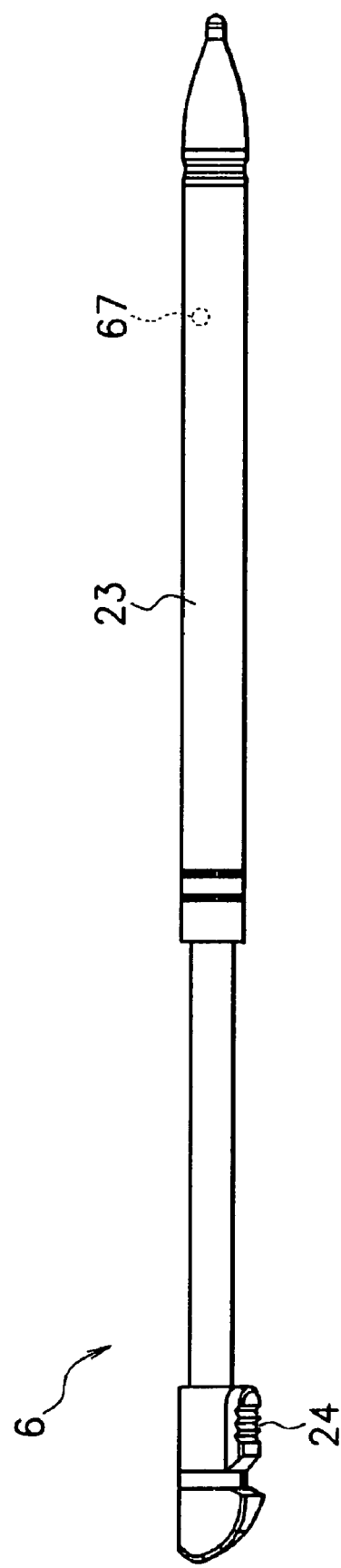
FIG. 26 is a diagram showing a TV antenna with function as an input pen 6 in which only the first node of the multistage antenna section 26 is extended to use it as an input pen.

That is, as shown in FIG. 26, the user can use the TV antenna with function as an input pen 6 as the input pen by extending only the first node of the multistage antenna section 26 on the pen body 23 side and lock the extension of the other nodes.

As shown in FIG. 26, in the TV antenna with function as an input pen 6 of this embodiment, the antenna extending and contracting operation convexity 24 is placed at the end on the antenna extending and contracting operation member 25 side of the first node (the thickest cylindrical body) of the multistage antenna section 26.

In this case, the antenna extending and contracting operation convexity 24 may be made of a resin at the end of the first node (the thickest cylindrical body) of the metallic multistage antenna section 26 on the antenna extending and contracting operation member 25 side.

When the TV antenna with function as an input pen 6 is mounted on the main body, the antenna fixing spring 68 is pressed by a lock releasing member 183 toward the outside in the radial direction of the inner first node (the thickest cylindrical body) of the multistage antenna section 26. Thus, the end portion of the antenna fixing spring 68 comes off the fixing concavity on the endmost node of the multistage antenna section 26 so as to release the lock.

Consequently, the user can freely extend the multistage antenna section 26 while the TV antenna with function as an input pen 6 is mounted on the main body.

As described above, according to the fifth embodiment, the lock by the antenna fixing spring 68 is released and the multistage antenna section 26 can be freely expanded and contracted by the user when the TV antenna with function as an input pen 6 is mounted on the main body. On the other hand, when the TV antenna with function as an input pen 6 is pulled out of the main body and used as the input pen, the lock is activated by the antenna fixing spring 68 so that the user cannot expand the multistage antenna section 26 except the first node (the thickest cylindrical body).

Since the TV antenna with function as an input pen 6 can be made usable as the input pen by extending the multistage antenna section 26 only by the first node on the pen body 23 side. Therefore, even in the case where the length of the TV antenna with function as an input pen 6 has to be reduced because the main body is extremely miniaturized, it is possible to ensure a suitable length as the input pen. Thus, the main body can be miniaturized, and the usability of the input pen can be improved.

With this configuration, while having entirely different functions of the TV receiving antenna and the input pen, the TV antenna with function as an input pen 6 allows the user to use both the functions in an optimal state as well as to adjust the length of the TV antenna 6 to secure a suitable length as the input pen.

In addition, extension and contraction of the TV antenna with function as an input pen 6 are limited only by the first node when it is used as the input pen. Accordingly, by limiting unnecessary expansion and contraction of the TV antenna with function as an input pen 6, it is possible to improve operability for the user and prevent damage or the like due to unnecessary expansion.

Further, as in the first and second embodiments, the TV antenna with function as an input pen 6 cannot be pushed to be detached from the main body unless the user contracts the multistage antenna section 26 and houses it completely in the pen body 23. Consequently, the TV antenna with function as an input pen 6 can be prevented from being improperly pulled out when used as a part of the TV receiving antenna.

That is, the TV antenna with function as an input pen 6 is prevented from being improperly pulled out or unnecessarily extended when used as either the TV receiving antenna or the input pen. Thus, it is possible to provide an optimal state of use to the user whichever function is used.

Incidentally, in the aforementioned fifth embodiment, the antenna fixing spring 68 is placed on the inner surface of the first node (the thickest cylindrical body) of the multistage antenna section 26. However, according to the present invention, the position of the antenna fixing spring 68 is not so limited, and it may be placed on the inner surface of another node (cylindrical body) of the plurality of cylindrical bodies configuring the multistage antenna section.

In this case, the slide movement of the cylindrical body on the further end side compared to the cylindrical body one step thinner than the cylindrical body having the antenna fixing spring 68 placed therein is locked.

Sixth Embodiment

Next, the sixth embodiment of the present invention will be described. The cellular phone of the sixth embodiment is basically similar in configuration to that of the first embodiment except for the presence of a hinge for rendering the multistage antenna section of the TV antenna with function as an input pen freely rotatable against the main body.

Like reference characters will refer to the same portions as those in the first embodiment, and the same description will not be repeated.

Figure 27:
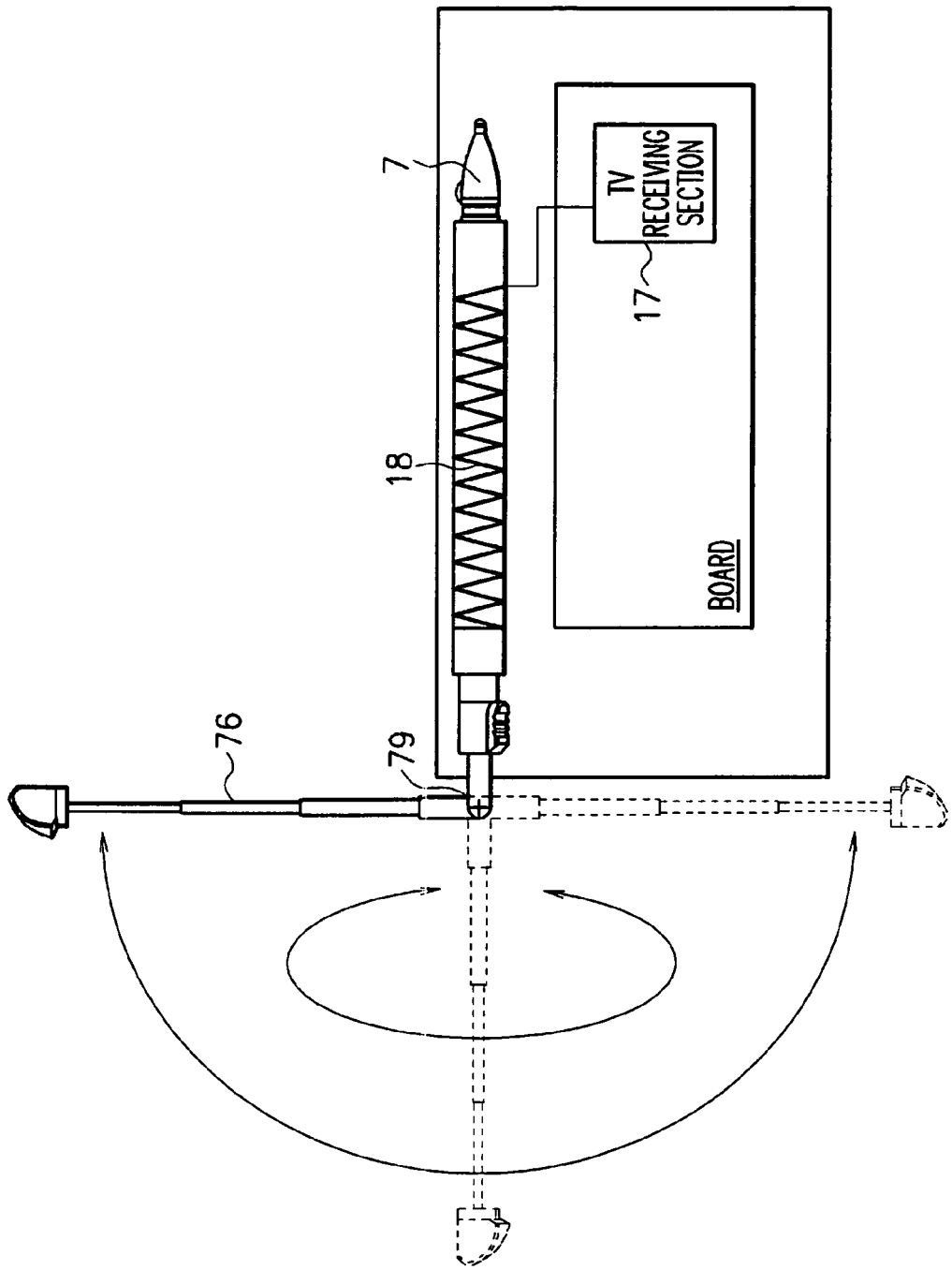
FIG. 27 is a diagram showing the movement and connection to a TV receiving section 17 of the multistage antenna section of a cellular phone according to the sixth embodiment of the present invention.
Figure 28:
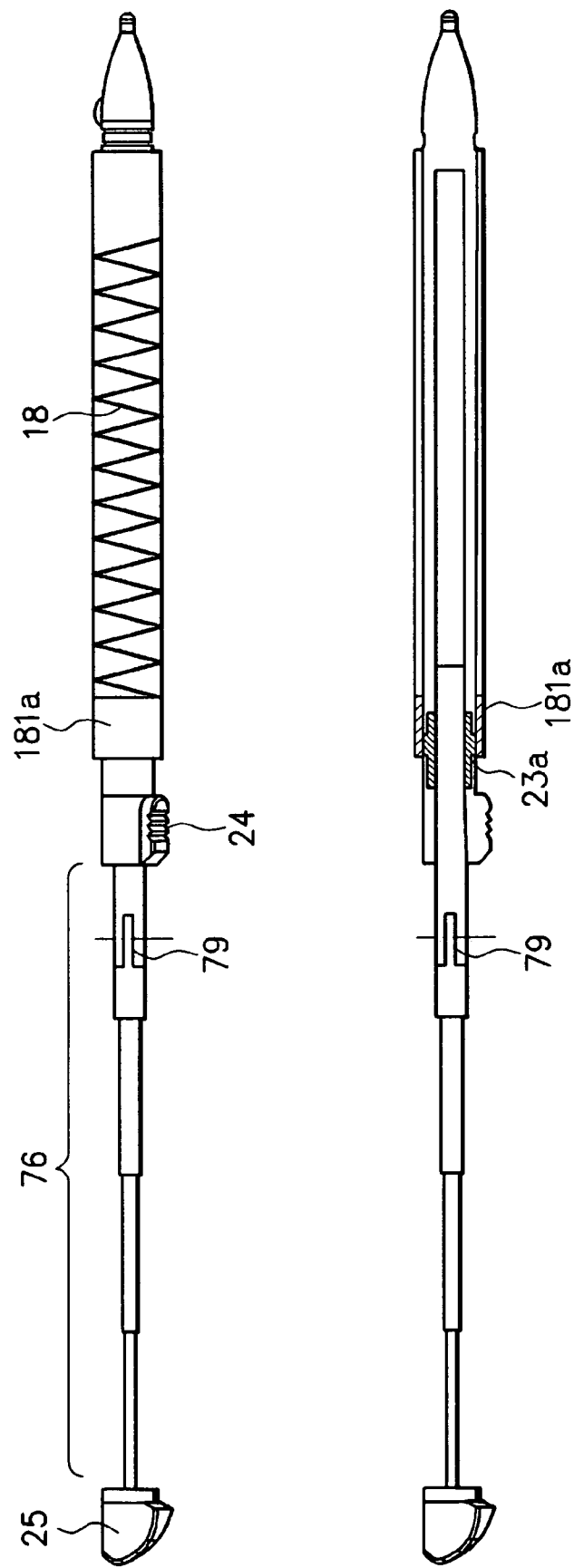
FIG. 28 is a diagram showing the TV antenna with function as an input pen 7 of the sixth embodiment is mounted on the mounting portion 181 and a sectional view thereof.
Figure 29:
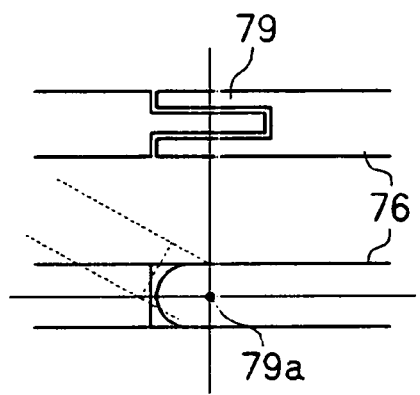
FIG. 29 is a partially enlarged view showing a hinge 79.

As shown in FIGS. 27 to 29, the cellular phone of the sixth embodiment has a hinge 79 provided to a multistage antenna section 76 of a TV antenna with function as an input pen 7.

When the TV antenna with function as an input pen 7 is mounted on the main body and used as the TV antenna, the hinge 79 renders the multistage antenna section 76 freely rotatable with three-degree-of-freedom in three-dimensional space to the extent of not hitting the main body as shown in FIG. 27.

Since the hinge 79 is thus provided, it is possible to improve the degree of freedom of adjustment so that the user can easily adjust the reception state of the TV signal by the TV antenna.

Figure 30:
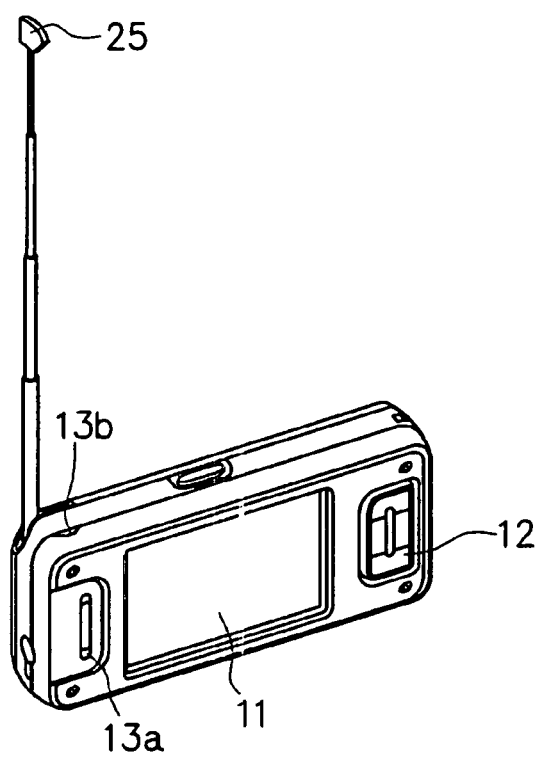
FIG. 30 is a perspective view showing an example of the appearance of the cellular phone when a multistage antenna section thereof is extended.

The main body can be placed rather freely as the degree of freedom of adjustment of the TV signal reception state is improved by the TV antenna with function as an input pen 7. Therefore, it is easier to adjust the reception state of the TV signal by angle adjustment of the multistage antenna section 76 even if, for example, the display/input section 11 is placed sideways as shown in FIG. 30.

As shown in FIGS. 27 and 28, the hinge 79 is provided in a portion of the multistage antenna section 76 exposed outside the main body when the antenna section 76 is extended. As shown in FIG. 29, the multistage antenna section 76 bends at a center 79a of the hinge 79, and is joined to the inside of the pen body 23 to be freely rotatable with the central axis in the longitudinal direction of the TV antenna with function as an input pen 7. Therefore, the hinge 79 is also freely rotatable with the central axis in the longitudinal direction of the TV antenna with function as an input pen 7.

Thus, the portion of the multistage antenna section 76 further on the end side compared to the hinge 79 is freely rotatable with three-degree-of-freedom in three-dimensional space to the extent of not hitting the main body.

Besides, as in the first embodiment, the reception state can be adjusted by extending and contracting the multistage antenna section 76. In the case of using the TV antenna with function as an input pen 7 as the TV antenna, it is possible to adjust the TV wave reception state by extending and contracting the antenna length as well as changing the direction thereof.

The hinge 79 is configured by the conductive materials as with the multistage antenna section 76. Therefore, in the case of using the TV antenna with function as an input pen 7 as the TV antenna, as shown in FIGS. 27 and 28, the multistage antenna section 76 is connected to the mounting portion antenna 18 via the antenna connection terminal 23a and the mounting portion side connection terminal 181a as in the first embodiment. Since the mounting portion antenna 18 is connected to the TV receiving section 17, the mounting portion antenna 18 and the TV antenna with function as an input pen 7 function as the TV receiving antennas.

In the case where the user uses the TV antenna with function as an input pen 7 as the input pen, as in the first embodiment, the mounting operation portion 25a is pushed with a fingertip in the direction to push it into the main body in the longitudinal direction of the TV antenna 7 while the multistage antenna section 76 is contracted. Thereby, the TV antenna with function as an input pen 7 is released from the hold state (state of being locked by the sandwiching member 182b) by the function of the latch switch 182 and pulled out of the main body.

Here, it is assumed that the user tries to pull the TV antenna with function as an input pen 7 out of the main body by pushing the bent hinge 79 into the main body to release the hold state by the latch switch 182. The hinge 79 is placed in a portion of the multistage antenna section 76 exposed outside the main body when it is extended as described above. Therefore, even if the bent hinge 79 is pushed into the main body, the multistage antenna section 76 is contracted, and the hold state by the latch switch 182 cannot be released.

For this reason, to release the hold state by the latch switch 182 and pull the TV antenna with function as an input pen 7 out of the main body when the TV antenna 7 is mounted on the main body, it is necessary to contract the multistage antenna section 76, house it completely inside the pen body 23, and then, push the mounting operation portion 25a into the main body.

As described above, according to this embodiment, the reception state of the TV signal by the TV antenna with function as an input pen 7 can be freely adjust with three-degree-of-freedom in three-dimensional space to the extent of not hitting the main body. It is thereby possible to improve the degree of freedom of the placement of the main body as well as the usability and operability for the user.

At the same time, as in the first embodiment, the TV antenna with function as an input pen 7 can be prevented from being improperly pulled out by the latch switch 182 when used as the TV receiving antenna, and further, accommodate the multistage antenna section 26 when used as the input pen for the manual input.

Thus, it is also possible to achieve the same effects as those described previously for the first embodiment.

Incidentally, in the above-mentioned sixth embodiment, the hinge 79 is provided at a root portion of the extended multistage antenna section 76 exposed outside the main body when it is extended. However, the position of the hinge 79 is not so limited, and may be placed at various positions according to the form of the main body so long as the multistage antenna section 76 can be rendered freely rotatable with three-degree-of-freedom in three-dimensional space to improve the degree of freedom of adjustment.

As in the first embodiment, the antenna extending and contracting operation convexity 24 is not necessarily placed at the end of the pen body 23 on the antenna extending and contracting operation member 25 side, but may also be placed at the end on the antenna extending and contracting operation member 25 side of the first node (the thickest cylindrical body) of the multistage antenna section 76 on the pen body 23 side.

In this case, when the user uses the TV antenna with function as an input pen 7 as the input pen, the TV antenna 7 is pulled out of the main body as described above, and then the first node of the multistage antenna section 76 on the pen body 23 side is extended so as to use it with the optimal length.

Thereby, even in the case where the length of the TV antenna with function as an input pen 7 has to be reduced because the main body is extremely miniaturized, it is possible to ensure a suitable length as the input pen. Thus, the main body can be miniaturized, and the usability of the input pen can be improved. Further an improvement is achieved in the degree of freedom of design.

Besides, in the above-mentioned sixth embodiment, the hinge is provided to the cellular phone of the first embodiment. However, the hinge may be provided to the cellular phone of the respective second to fifth embodiments.

In the case of applying the hinge to the cellular phone of each embodiment, the reception state of the TV signal by the TV antenna with function as an input pen can be freely adjusted with three-degree-of-freedom in three-dimensional space to the extent of not hitting the main body. It is thereby possible to improve the degree of freedom of the placement of the main body. Thus, the usability and operability for the user can be improved.

Seventh Embodiment

Next, the seventh embodiment of the present invention will be described. The cellular phone of the seventh embodiment is basically similar in configuration to that of the first embodiment except for the presence of a mounting state detecting switch for detecting whether or not the TV antenna with function as an input pen is mounted on the main body.

Like reference characters will refer to the same portions as those in the first embodiment, and the same description will not be repeated.

As shown in FIG. 31, the cellular phone of the seventh embodiment has a mounting state detecting switch 184 provided in the vicinity of an ejection opening on the periphery of the mounting portion 181. The mounting state detecting switch 184 detects whether or not the TV antenna with function as an input pen 2 is mounted on the mounting portion 181 of the main body.

The mounting state detecting switch 184 is configured such that a projection for detection is inserted inward from the periphery of the mounting portion 181. If the TV antenna with function as an input pen 2 is inserted into the main body, it pushes up the projection for detection toward the outside in the radial direction of the mounting portion 181 so that the insertion is detected according to the condition of the projection for detection.

Figure 32:
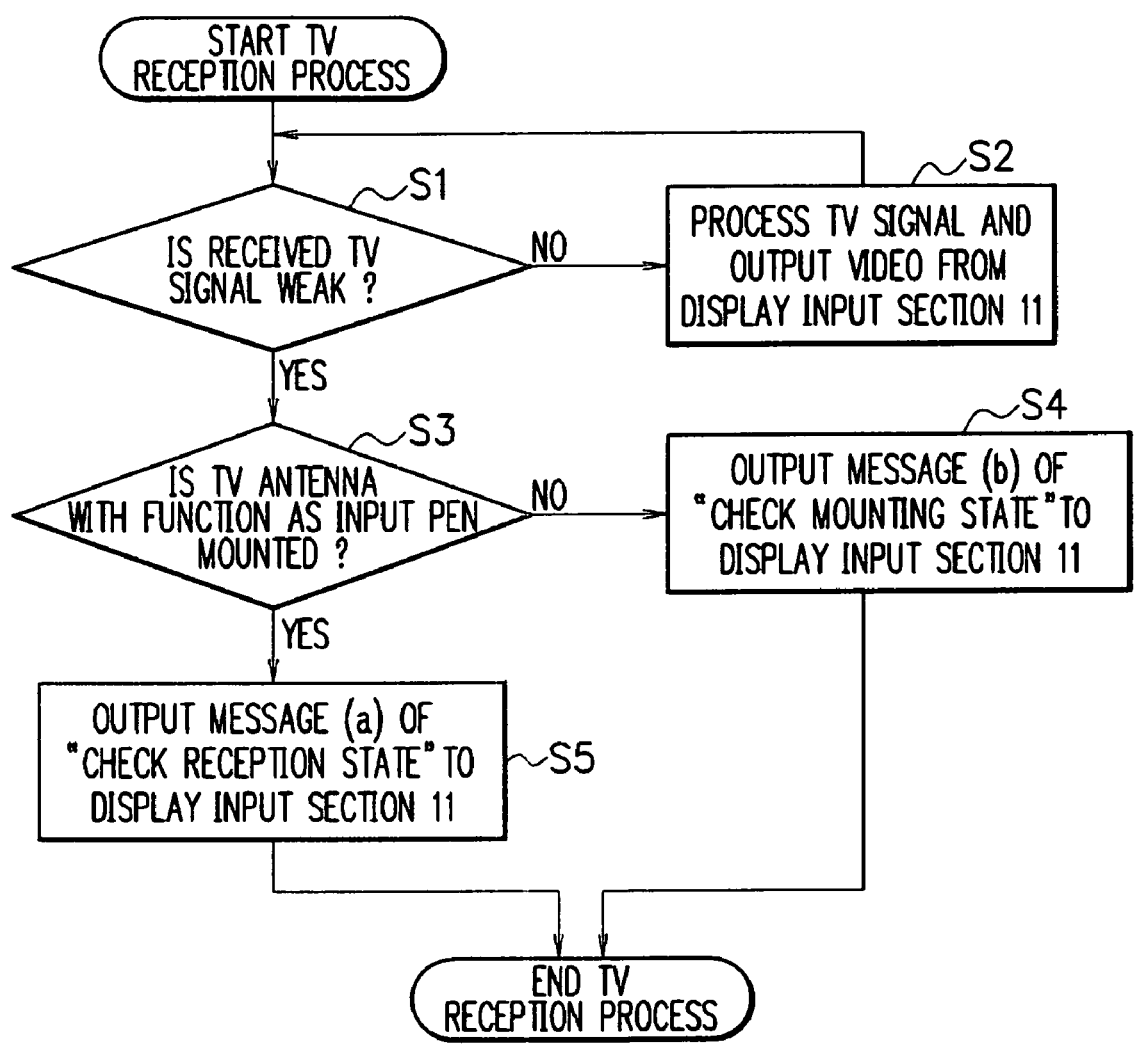
FIG. 32 is a flowchart showing an example of operation for displaying an operational message relating to TV antenna state.

Next, referring to a flowchart of FIG. 32, a description will be given of the operation of the cellular phone, when the user watches TV by the phone, to display a suitable operational message relating to TV antenna state based on the detection result obtained by the mounting state detecting switch 184.

When starting the TV reception process, the main controller 16 detects the level of a TV signal transmitted through the TV receiving section 17 (step S1). In the case where the strength of the detected TV signal is not weak (higher than a preset threshold), the main controller 16 does not indicate a message as to "check the mounting state of the TV antenna with function as an input pen" but controls the display/ input section 11 to display the TV image (step S2).

In the case where the TV signal level detected in step S1 is weak (lower than the preset threshold), the main controller 16 refers to the detection result of the mounting state of the TV antenna with function as an input pen 2 obtained by the mounting state detecting switch 184.

If the detection result is "mounted" (step S3; Yes), the main controller 16 causes the display/input section 11 to display a message for prompting the user to check the reception state by the TV antenna, for example, as shown in FIG. 33 (a).

If the detection result is "not mounted" (step S3; No), the main controller 16 causes the display/input section 11 to display a message for prompting the user to mount the TV antenna with function as an input pen 2, for example, as shown in FIG. 33 (b).

As described above, according to the seventh embodiment, the mounting state detecting switch 184 detects whether or not the TV antenna with function as an input pen is mounted.

Therefore, it is feasible to display a suitable operational message relating to the TV antenna state if the TV signal reception state is poor.

Consequently, it is possible to prompt the user to mount the TV antenna with function as an input pen when it is mounted or prompt him/her to adjust the reception state when it is mounted but the reception state is poor.

Since, in the seventh embodiment, the cellular phone of the first embodiment further includes the mounting state detecting switch 184, it is possible to achieve the same effects as those in the first embodiment.

Incidentally, the message shown in FIG. 33 is given only as an example of the one displayed when the TV signal reception state is poor. The contents of the message may be varied according to its purpose.

In the seventh embodiment, the mounting state detecting switch 184 is placed in the vicinity of the ejection opening on the periphery of the mounting portion 181. However, the mounting state detecting switch 184 may be placed at any position on the periphery of the mounting portion 181 according to the purpose of the mounting state detection and the contents of a display message.

The configuration for detecting the mounting state of the TV antenna with function as an input pen 2 is not limited to that of the mounting state detecting switch 184 described above in connection with FIG. 31. Various configurations may be adopted so long as it is capable of detecting the mounting state, as, for example, a detection switch may be provided to the latch switch 182 to detect the open and closed state.

With this configuration, it is possible to more reliably detect whether or not the TV antenna with function as an input pen 2 is mounted on the main body.

In addition, in the seventh embodiment, the mounting state detecting switch is cited as an example of the means for detecting the mounting state of the TV antenna with function as an input pen 2 and without limitation. However, any means may be adopted if capable of detecting the mounting state. For instance, the detection may be performed only by the strength of the TV signal from the TV receiving section 17, and the main controller 16 may cause the display/input section 11 to display the message for prompting the adjustment of the reception state if the strength of the detected TV signal is lower than a predetermined threshold.

Further, in the seventh embodiment, the mounting state detecting switch was provided to the cellular phone of the first embodiment. However, the mounting state detecting switch may be provided to the cellular phone of the respective second to sixth embodiments.

In the case of applying the mounting state detecting switch to the cellular phone of each embodiment, it is possible to detect whether or not the TV antenna with function as an input pen is mounted. Therefore, it is feasible to display a suitable operational message relating to the TV antenna state if the TV signal reception state is poor, prompt the user to mount the TV antenna with function as an input pen if it is not mounted, and prompt him/her to adjust the reception state if it is mounted but the reception state is poor.

Incidentally, the foregoing is considered as illustrative only of preferred embodiments of the present invention, and is not intended to limit the scope of the invention. The embodiments described above are susceptible to various modifications and changes.

For example, in the above description, the input end portion 21, the fixing portion 22, the pen body 23 and the mounting portion 181 are made of insulating material such as plastic. However, the insulating material may be an arbitrary material such as various resin materials if insulative.

Also, in the above description, the mounting portion antenna 18 and the multistage antenna section are configured by the conductive materials to function as the TV receiving antennas. The conductive materials may be any materials having conductivity, such as iron, copper, alloys including them and plated metals.

In the above description, the material of the input end portion 21 may be the same material used for the fixing portion 22 and the pen body 23. The material may be any insulating material not damaging the display/input section 11, such as a material less hard than the display/input section 11 or a material rendered non-damaging to the display/input section 11 by reducing its friction factor rather than its degree of hardness.

In the above description, the mounting portion antenna 18 is a coil antenna wound around the periphery of the mounting portion 181. However, the mounting portion antenna 18 may be of various forms if capable of ensuring an optimal length as the TV receiving antenna by being connected to the multistage antenna section 26 of the TV antenna with function as an input pen 2, such as a meander antenna.

In the case where it is possible to ensure the optimal length as the TV receiving antenna only with a multistage antenna, the mounting portion antenna may be omitted.

According to the above-mentioned embodiments, the antenna extending and contracting operation convexity 24 was placed at the end of the pen body 23 on the antenna extending and contracting operation member 25 side or at the end on the antenna extending and contracting operation member 25 side of the first node (the thickest cylindrical body) of the multistage antenna section 26 on the pen body 23 side. However, the antenna extending and contracting operation convexity 24 may be placed at any position according to the size and design of the main body.

Thereby, even in the case where the length of the TV antenna with function as an input pen has to be reduced because the main body is extremely miniaturized, it is possible to ensure the suitable length as the input pen. Thus, the main body can be miniaturized, and the usability and design of the input pen can be improved, resulting in an improvement in the degree of freedom of design.

According to the above-mentioned embodiments, the proper length of the TV receiving antenna is adjusted by extending or contracting the multistage antenna section. However, the multistage antenna section may also be configured to have an optimal length for receiving VHF in the state of being extended to the maximum and have an optimal length for receiving UHF when contracted to a predetermined length.

The lock releasing member 183 may have an arbitrary configuration if capable of releasing the lock of the slide movement to the multistage antenna section 26 with the antenna fixing spring. For example, the releasing end of the lock releasing member 183 may be electrically inserted into the lock releasing opening to release the lock.

Additionally, the antenna fixing spring may be compressed toward the outside in the radial direction of the cylindrical body by non-contact means such as an electromagnet to release the lock of the slide movement.

In the above-mentioned embodiments, the user can view and hear both the images and sounds of TV programs. However, it is not so limited if TV programs can be received. The present invention is applicable to the case where only the sounds or images of TV programs are received.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A portable terminal apparatus with TV function, comprising:
   a display/input section capable of displaying a TV image and receiving an input from a touch panel;
   a controller for controlling the display/input section to display the TV image thereon; and
   a TV receiving antenna formed of elastically combined conductive materials and connected to the controller, wherein:
   the TV receiving antenna includes a TV antenna with function as an input pen configuring a part of the TV receiving antenna and functioning as an input pen for providing input to the display/input section and further includes a mounting portion antenna; and
   the TV antenna with function as an input pen has a bendable hinge freely rotatable with its central axis in the longitudinal direction of the TV antenna at a position exposed outside the apparatus when the TV antenna is mounted on the apparatus and completely extended in the longitudinal direction.

2. The portable terminal apparatus with TV function according to claim 1, further comprising:
   a latch mechanism for supporting the TV antenna with function as an input pen on the portable terminal apparatus with TV function in such a manner that the TV antenna is demountable from the apparatus by being pushed into the apparatus in a longitudinal direction when mounted on the apparatus, wherein:
   the TV antenna with function as an input pen is pushed into the apparatus by contracting a portion formed of elastically combined conductive materials and detachably mounted on the apparatus.

3. The portable terminal apparatus with TV function according to claim 2, wherein, when the TV antenna with function as an input pen is pushed into and mounted on the apparatus, the latch mechanism locks the TV antenna to prevent it from coming off in the longitudinal direction, and releases the lock when the TV antenna in the locked state is pushed into the apparatus in the longitudinal direction thereof.

4. The portable terminal apparatus with TV function according to claim 2, wherein the controller controls the display/input section to display a message for prompting adjustment of the reception state when TV signal strength is lower than a predetermined threshold.

5. The portable terminal apparatus with TV function according to claim 1, wherein the TV receiving antenna includes:
   a multistage antenna section of the TV antenna with function as an input pen; and
   an in-apparatus antenna section configured to be electrically conductive with the multistage antenna section when the TV antenna with function as an input pen is mounted on the apparatus, and connected to the controller.

6. The portable terminal apparatus with TV function according to claim 5, wherein, while the TV antenna is mounted on the apparatus, the TV antenna with function as an input pen is pushed into the apparatus only by contracting the multistage antenna section and housing it completely inside the TV antenna.

7. The portable terminal apparatus with TV function according to claim 5, wherein:
   the multistage antenna section is configured by concentrically combining a plurality of cylindrical bodies; and
   the cylindrical body with the smallest radius in the concentric circles is most distant from the contact input portion contacted with the display/input section to provide input while the multistage antenna section is extended and housed inside the TV antenna with function as an input pen while the multistage antenna section is contracted.

8. The portable terminal apparatus with TV function according to claim 5, wherein the in-apparatus antenna section is a coil antenna or a meander antenna.

9. The portable terminal apparatus with TV function according to claim 5, wherein the multistage antenna section has an optimal length for receiving VHF when extended to the maximum, and has an optimal length for receiving UHF when contracted to a predetermined length.

10. The portable terminal apparatus with TV function according to claim 1, wherein the hinge is placed at a position to which the TV antenna with function as an input pen moves when extended and contracted.

11. The portable terminal apparatus with TV function according to claim 1, further comprising:
    a mounting state detecting section for detecting whether or not the TV antenna with function as an input pen is mounted on the apparatus, wherein:
    the controller controls the display/input section to display a message for prompting adjustment of the reception state according to the detection result obtained by the mounting state detecting section when TV signal strength is lower than a predetermined threshold.

12. The portable terminal apparatus with TV function according to claim 1, wherein the TV antenna with function as an input pen has the portion, which is configured integrally with the contact input portion contacted with the display/input section to provide input, made of insulating material except for a contact portion for rendering the elastically combined conductive materials to function as the TV receiving antenna.

13. A portable terminal apparatus with TV function, comprising:
    a display/input section capable of displaying a TV image and receiving an input from a touch panel;
    a controller for controlling the display/input section to display the TV image thereon; and
    a TV receiving antenna formed of elastically combined conductive materials and connected to the controller, wherein:
    the TV receiving antenna includes a TV antenna with function as an input pen configuring a part of the TV receiving antenna and functioning as an input pen for providing input to the display/input section and further includes a mounting portion antenna, wherein:
    the TV antenna with function as an input pen is configured to be extendable and contractible in the longitudinal direction thereof, and is mounted on the apparatus so that, while the TV antenna is mounted on the apparatus, a pushing portion of an operational member provided for pushing the TV antenna into the apparatus in the longitudinal direction of the TV antenna is exposed outside the apparatus and a portion of the TV antenna configured integrally with a contact input portion contacted with the display/input section to provide input cannot be pushed into the apparatus.

14. The portable terminal apparatus with TV function according to claim 13, wherein the TV antenna with function as an input pen is housed inside the apparatus so that, while the TV antenna is mounted on the apparatus, the portion configured integrally with the contact input portion is exposed only in one direction incapable of being sandwiched and held in the direction vertical to the longitudinal direction of the TV antenna.

15. The portable terminal apparatus with TV function according to claim 13, wherein the TV antenna with function as an input pen is housed inside the apparatus so that, while the TV antenna is mounted on the apparatus, the portion configured integrally with the contact input portion is not exposed outside the apparatus.

16. The portable terminal apparatus with TV function according to claim 13, wherein the TV antenna with function as an input pen is housed inside the apparatus so that, while the TV antenna is mounted on the apparatus, only the pushing portion of the operational member provided for pushing the TV antenna into the apparatus in the longitudinal direction of the TV antenna is exposed.

17. A portable terminal apparatus with TV function, comprising:
a display/input section capable of displaying a TV image and receiving an input from a touch panel;
a controller for controlling the display/input section to display the TV image thereon; and
a TV receiving antenna formed of elastically combined conductive materials and connected to the controller, wherein the TV receiving antenna includes a TV antenna with function as an input pen configuring a part of the TV receiving antenna and functioning as an input pen for providing input to the display/input section and further includes a mounting portion antenna;
a latch mechanism for supporting the TV antenna with function as an input pen on the portable terminal apparatus with TV function in such a manner that the TV antenna is demountable from the apparatus by being pushed into the apparatus in a longitudinal direction when mounted on the apparatus, wherein:
the TV antenna with function as an input pen is pushed into the apparatus by contracting a portion formed of elastically combined conductive materials and detachably mounted on the apparatus;
the TV antenna with function as an input pen has a movement lock concavity provided for limiting longitudinal movement thereof by the latch mechanism;
the latch mechanism includes a sandwiching member for sandwiching and supporting the TV antenna with function as an input pen with the movement lock concavity; and
when the TV antenna is in the locked state, the sandwiching member is fixed in a state of sandwiching it from both sides in a direction substantially vertical to the longitudinal direction of the TV antenna so as to lock the TV antenna and prevent it from coming off the apparatus.

18. The portable terminal apparatus with TV function according to claim 17, wherein the latch mechanism releases the lock by opening the sandwiching member sandwiching the TV antenna with function as an input pen from both sides to lock it when the TV antenna is pushed into the apparatus in the longitudinal direction.

19. The portable terminal apparatus with TV function according to claim 18, wherein the latch mechanism is placed at a position to be pressed by the contact input portion in the longitudinal direction of the TV antenna with function as an input pen when the TV antenna is pushed into the apparatus, and has a push switch for opening and closing the sandwiching member at the position to be pressed.

20. The portable terminal apparatus with TV function according to claim 19, wherein, when the push switch is pushed to release the lock, the latch mechanism ejects the TV antenna with function as an input pen to the outside of the apparatus in the longitudinal direction in reaction to the push switch pushed back.

21. A portable terminal apparatus with TV function, comprising:
a display/input section capable of displaying a TV image and receiving an input from a touch panel;
a controller for controlling the display/input section to display the TV image thereon; and
a TV receiving antenna formed of elastically combined conductive materials and connected to the controller, wherein:
the TV receiving antenna includes a TV antenna with function as an input pen configuring a part of the TV receiving antenna and functioning as an input pen for providing input to the display/input section and further includes a mounting portion antenna, wherein the TV receiving antenna includes:
a multistage antenna section of the TV antenna with function as an input pen; and
an in-apparatus antenna section configured to be electrically conductive with the multistage antenna section when the TV antenna with function as an input pen is mounted on the apparatus, and connected to the controller, wherein:
the multistage antenna section is configured by concentrically combining a plurality of cylindrical bodies; and
the cylindrical body with the smallest radius in the concentric circles is most distant from the contact input portion contacted with the display/input section to provide input while the multistage antenna section is extended and housed inside the TV antenna with function as an input pen while the multistage antenna section is contracted; and
the TV antenna with function as an input pen includes an extension preventing section for preventing extension of the multistage antenna section when the TV antenna with function as an input pen is not mounted on the apparatus.

22. The portable terminal apparatus with TV function according to claim 21, wherein the extension preventing section is placed inside the main body of a pen corresponding to the cylindrical body portion of the TV antenna with function as an input pen for housing the multistage antenna section while the multistage antenna section is contracted, and locks the slide movement of the thinnest cylindrical body of the multistage antenna section to lock the slide movement of all the cylindrical bodies configuring the multistage antenna section.

23. The portable terminal apparatus with TV function according to claim 22, wherein the extension preventing section is a plate spring charged to have elastic resilience toward the center in the radial direction of the cylindrical body having the extension preventing section placed therein, and, when subjected to no pressure from the outside, presses the edge against a fixing concavity provided to the thinnest cylindrical body of the multistage antenna section by the resilience to lock the slide movement of the thinnest cylindrical body.

24. The portable terminal apparatus with TV function according to claim 23, further comprising a lock releasing section for, when the TV antenna with function as an input pen is mounted on the apparatus, releasing the lock of the slide movement by pressing the plate spring toward the outside in the radial direction of the cylindrical body having the plate spring placed therein.

25. The portable terminal apparatus with TV function according to claim 24, wherein the lock releasing section exerts pressure to release the lock by the plate spring in response to the insertion of the releasing end into the TV antenna with function as an input pen when the TV antenna is mounted on the apparatus, and releases the pressure in response to the pull-out of the releasing end from the TV antenna with function as an input pen when the TV antenna is pulled out of the apparatus.

26. The portable terminal apparatus with TV function according to claim 25, wherein:

the lock releasing section is supported on the apparatus by a rotation axis further inside from the releasing end and the end other than the releasing end so that the support allows the lock releasing section to rotate against the apparatus, and charged by a spring to have elastic resilience in such a direction that the releasing end moves away from the TV antenna;

when the end other than the releasing end is pushed by the mounting of the TV antenna with function as an input pen on the apparatus, the releasing end presses the plate spring toward the outside in the radial direction of the cylindrical body to release the lock by the plate spring by rotational movement about the rotation axis; and when the TV antenna with function as an input pen is pulled out of the apparatus, the releasing end rotates, due to the charge of the spring, about the rotation axis in such a direction that the releasing end moves away from the TV antenna so that the rotation causes the plate spring not to be pressed toward the outside in the radial direction of the cylindrical body.

27. The portable terminal apparatus with TV function according to claim 21, wherein the extension preventing section is placed inside one of the plurality of cylindrical bodies configuring the multistage antenna section, and locks the slide movement of the thinnest cylindrical body of the multistage antenna section to lock the slide movement of the cylindrical body on the further end side compared to the cylindrical body one step thinner than the cylindrical body having the extension preventing section placed therein.

* * * * *